(12) United States Patent
Nordahl et al.

(10) Patent No.: US 12,460,194 B2
(45) Date of Patent: Nov. 4, 2025

(54) CYSTEINE PROTEASE

(71) Applicant: Hansa Biopharma AB, Lund (SE)

(72) Inventors: Emma Andersson Nordahl, Lund (SE); Christian Kjellman, Lund (SE); Kaisa Karhumaa, Lund (SE); Karl Markus Roupé, Lund (SE); Robert Bockermann, Lund (SE); Sofia Järnum, Lund (SE)

(73) Assignee: Hansa Biopharma AB, Lund (SE)

( * ) Notice: Subject to any disclaimer, the term of this patent is extended or adjusted under 35 U.S.C. 154(b) by 432 days.

(21) Appl. No.: 17/999,246

(22) PCT Filed: May 18, 2021

(86) PCT No.: PCT/EP2021/063131
§ 371 (c)(1),
(2) Date: Nov. 18, 2022

(87) PCT Pub. No.: WO2021/233911
PCT Pub. Date: Nov. 25, 2021

(65) Prior Publication Data
US 2024/0360432 A1    Oct. 31, 2024

(30) Foreign Application Priority Data
May 19, 2020 (GB) .................... 2007431

(51) Int. Cl.
*C12N 9/52* (2006.01)
*A61K 38/00* (2006.01)
*C12N 15/70* (2006.01)

(52) U.S. Cl.
CPC .............. *C12N 9/52* (2013.01); *C12N 15/70* (2013.01); *A61K 38/00* (2013.01); *C07K 2319/21* (2013.01); *C12Y 304/22* (2013.01)

(58) Field of Classification Search
CPC ..... C12N 9/52; A61K 38/4873; C12Y 304/22
See application file for complete search history.

(56) References Cited

U.S. PATENT DOCUMENTS

2018/0037962 A1*   2/2018   Kjellman .................. A61P 7/06

FOREIGN PATENT DOCUMENTS

| WO | 2003/051914 A2 | 6/2003 |
| WO | 2009/033670 A2 | 3/2009 |
| WO | 2016/046220 A1 | 3/2016 |
| WO | 2016/128558 A1 | 8/2016 |

(Continued)

OTHER PUBLICATIONS

Greta Hulting et al., "Two novel IgG endopeptidases of *Streptococcus equi*", FEMS Microbiology Letters, vol. 298, No. 1, Sep. 1, 2009 (Sep. 1, 2009), pp. 44-50.

(Continued)

*Primary Examiner* — Gary B Nickol
*Assistant Examiner* — Amelia Nicole Dickens
(74) *Attorney, Agent, or Firm* — Norton Rose Fulbright US LLP

(57) ABSTRACT

The present invention relates to a novel polypeptide which displays IgG cysteine protease activity, and in vivo and ex vivo uses thereof. Uses of the polypeptide include methods for the prevention or treatment of diseases and conditions mediated by IgG, and methods for the analysis of IgG and in vitro generation of F(ab')2 fragments.

7 Claims, 10 Drawing Sheets
Specification includes a Sequence Listing.

(56) References Cited

FOREIGN PATENT DOCUMENTS

| WO | 2016/128559 A1 | 8/2016 |
| WO | 2020/016318 A1 | 1/2020 |
| WO | 2020/102740 A2 | 5/2020 |
| WO | 2020/159970 A1 | 8/2020 |

OTHER PUBLICATIONS

Von Pawel-Rammingen Ulrich: "Streptococcal IdeS and Its Impact on Immune Response and Inflammation", Journal of Innate Immunity, vol. 4, No. 2, Jan. 1, 2012 (Jan. 1, 2012), pp. 132-140.

\* cited by examiner

A

B

C

D

SEQUENCE LISTING

<160> NUMBER OF SEQ ID NOS: 23

<210> SEQ ID NO 1
<211> LENGTH: 312
<212> TYPE: PRT
<213> ORGANISM: Streptococcus equi ssp. Zooepidemicus

<400> SEQUENCE: 1

Asp Asp Tyr Gln Arg Asn Ala Thr Glu Ala Tyr Ala Lys Glu Val Pro
1               5                   10                  15

His Gln Ile Thr Ser Val Trp Thr Lys Gly Val Thr Pro Glu Gln
                20                  25                  30

Phe Thr Gln Gly Glu Asp Val Ile His Ala Pro Tyr Leu Ala His Gln
            35                  40                  45

Gly Trp Tyr Asp Ile Thr Lys Ala Phe Asn Gly Lys Asp Asp Leu Leu
 50                  55                  60

Cys Gly Ala Ala Thr Ala Gly Asn Met Leu His Trp Trp Phe Asp Gln
 65                  70                  75                  80

Asn Lys Thr Glu Ile Glu Ala Tyr Leu Ser Lys His Pro Glu Lys Gln
                85                  90                  95

Lys Ile Ile Phe Arg Asn Gln Glu Leu Phe Asp Leu Lys Ala Ala Ile
            100                 105                 110

Asp Thr Lys Asp Ser Gln Thr Asn Ser Gln Leu Phe Asn Tyr Phe Arg
        115                 120                 125

Asp Lys Ala Phe Pro Asn Leu Ser Ala Arg Gln Leu Gly Val Met Pro
130                 135                 140

Asp Leu Val Leu Asp Met Phe Ile Asn Gly Tyr Tyr Leu Asn Val Phe
145                 150                 155                 160

Lys Thr Gln Ser Thr Asp Val Asn Arg Pro Tyr Gln Asp Lys Asp Lys
                165                 170                 175

Arg Gly Gly Ile Phe Asp Ala Val Phe Thr Arg Gly Asn Gln Thr Thr
            180                 185                 190

Leu Leu Thr Ala Arg His Asp Leu Lys Asn Lys Gly Leu Asn Asp Ile
        195                 200                 205

Ser Thr Ile Ile Lys Gln Glu Leu Thr Glu Gly Arg Ala Leu Ala Leu
210                 215                 220

Ser His Thr Tyr Ala Asn Val Ser Ile Ser His Val Ile Asn Leu Trp
225                 230                 235                 240

Gly Ala Asp Phe Asn Ala Glu Gly Asn Leu Glu Ala Ile Tyr Val Thr
                245                 250                 255

Asp Ser Asp Ala Asn Ala Ser Ile Gly Met Lys Lys Tyr Phe Val Gly
            260                 265                 270

Ile Asn Ala His Gly His Val Ala Ile Ser Ala Lys Lys Ile Glu Gly
        275                 280                 285

Glu Asn Ile Gly Ala Gln Val Leu Gly Leu Phe Thr Leu Ser Ser Gly
290                 295                 300

Lys Asp Ile Trp Gln Lys Leu Ser
305                 310

<210> SEQ ID NO 2
<211> LENGTH: 292
<212> TYPE: PRT
<213> ORGANISM: Streptococcus equi ssp. Zooepidemicus

<400> SEQUENCE: 2

Ser Val Trp Thr Lys Gly Val Thr Pro Pro Glu Gln Phe Thr Gln Gly
 1               5                  10                  15

Glu Asp Val Ile His Ala Pro Tyr Leu Ala His Gln Gly Trp Tyr Asp
            20                  25                  30

Ile Thr Lys Ala Phe Asn Gly Lys Asp Asp Leu Leu Cys Gly Ala Ala
        35                  40                  45

Thr Ala Gly Asn Met Leu His Trp Trp Phe Asp Gln Asn Lys Thr Glu
50                  55                  60

Ile Glu Ala Tyr Leu Ser Lys His Pro Glu Lys Gln Lys Ile Ile Phe

```
             65                  70                  75                  80
Arg Asn Gln Glu Leu Phe Asp Leu Lys Ala Ala Ile Asp Thr Lys Asp
                    85                  90                  95

Ser Gln Thr Asn Ser Gln Leu Phe Asn Tyr Phe Arg Asp Lys Ala Phe
                100                 105                 110

Pro Asn Leu Ser Ala Arg Gln Leu Gly Val Met Pro Asp Leu Val Leu
                115                 120                 125

Asp Met Phe Ile Asn Gly Tyr Tyr Leu Asn Val Phe Lys Thr Gln Ser
        130                 135                 140

Thr Asp Val Asn Arg Pro Tyr Gln Asp Lys Asp Lys Arg Gly Gly Ile
145                 150                 155                 160

Phe Asp Ala Val Phe Thr Arg Gly Asn Gln Thr Thr Leu Leu Thr Ala
                165                 170                 175

Arg His Asp Leu Lys Asn Lys Gly Leu Asn Asp Ile Ser Thr Ile Ile
                180                 185                 190

Lys Gln Glu Leu Thr Glu Gly Arg Ala Leu Ala Leu Ser His Thr Tyr
                195                 200                 205

Ala Asn Val Ser Ile Ser His Val Ile Asn Leu Trp Gly Ala Asp Phe
        210                 215                 220

Asn Ala Glu Gly Asn Leu Glu Ala Ile Tyr Val Thr Asp Ser Asp Ala
225                 230                 235                 240

Asn Ala Ser Ile Gly Met Lys Lys Tyr Phe Val Gly Ile Asn Ala His
                245                 250                 255

Gly His Val Ala Ile Ser Ala Lys Lys Ile Glu Gly Glu Asn Ile Gly
                260                 265                 270

Ala Gln Val Leu Gly Leu Phe Thr Leu Ser Ser Gly Lys Asp Ile Trp
                275                 280                 285

Gln Lys Leu Ser
        290

<210> SEQ ID NO 3
<211> LENGTH: 315
<212> TYPE: PRT
<213> ORGANISM: Streptococcus equi ssp. Zooepidemicus

<400> SEQUENCE: 3

Asp Asp Tyr Gln Arg Asn Ala Thr Glu Ala Tyr Ala Lys Glu Val Pro
1               5                   10                  15

His Gln Ile Thr Ser Val Trp Thr Lys Gly Val Thr Pro Leu Thr Pro
                20                  25                  30

Glu Gln Phe Arg Tyr Asn Asn Glu Asp Val Ile His Ala Pro Tyr Leu
            35                  40                  45

Ala His Gln Gly Trp Tyr Asp Ile Thr Lys Ala Phe Asp Gly Lys Asp
        50                  55                  60

Asn Leu Leu Cys Gly Ala Ala Thr Ala Gly Asn Met Leu His Trp Trp
65                  70                  75                  80

Phe Asp Gln Asn Lys Thr Glu Ile Glu Ala Tyr Leu Ser Lys His Pro
                85                  90                  95

Glu Lys Gln Lys Ile Ile Phe Asn Asn Gln Glu Leu Phe Asp Leu Lys
                100                 105                 110

Ala Ala Ile Asp Thr Lys Asp Ser Gln Thr Asn Ser Gln Leu Phe Asn
            115                 120                 125

Tyr Phe Arg Asp Lys Ala Phe Pro Asn Leu Ser Ala Arg Gln Leu Gly
        130                 135                 140
```

```
Val Met Pro Asp Leu Val Leu Asp Met Phe Ile Asn Gly Tyr Tyr Leu
145                 150                 155                 160

Asn Val Phe Lys Thr Gln Ser Thr Asp Val Asn Arg Pro Tyr Gln Asp
            165                 170                 175

Lys Asp Lys Arg Gly Ile Phe Asp Ala Val Phe Thr Arg Gly Asp
        180                 185                 190

Gln Thr Thr Leu Leu Thr Ala Arg His Asp Leu Lys Asn Lys Gly Leu
            195                 200                 205

Asn Asp Ile Ser Thr Ile Ile Lys Gln Glu Leu Thr Glu Gly Arg Ala
210                 215                 220

Leu Ala Leu Ser His Thr Tyr Ala Asn Val Ser Ile Ser His Val Ile
225                 230                 235                 240

Asn Leu Trp Gly Ala Asp Phe Asn Ala Glu Gly Asn Leu Glu Ala Ile
                245                 250                 255

Tyr Val Thr Asp Ser Asp Ala Asn Ala Ser Ile Gly Met Lys Lys Tyr
                260                 265                 270

Phe Val Gly Ile Asn Ala His Gly His Val Ala Ile Ser Ala Lys Lys
                275                 280                 285

Ile Glu Gly Glu Asn Ile Gly Ala Gln Val Leu Gly Leu Phe Thr Leu
290                 295                 300

Ser Ser Gly Lys Asp Ile Trp Gln Lys Leu Ser
305                 310                 315

<210> SEQ ID NO 4
<211> LENGTH: 310
<212> TYPE: PRT
<213> ORGANISM: Streptococcus pyogenes

<400> SEQUENCE: 4

Asp Ser Phe Ser Ala Asn Gln Glu Ile Arg Tyr Ser Glu Val Thr Pro
1               5                   10                  15

Tyr His Val Thr Ser Val Trp Thr Lys Gly Val Thr Pro Pro Ala Asn
            20                  25                  30

Phe Thr Gln Gly Glu Asp Val Phe His Ala Pro Tyr Val Ala Asn Gln
        35                  40                  45

Gly Trp Tyr Asp Ile Thr Lys Thr Phe Asn Gly Lys Asp Asp Leu Leu
    50                  55                  60

Cys Gly Ala Ala Thr Ala Gly Asn Met Leu His Trp Trp Phe Asp Gln
65                  70                  75                  80

Asn Lys Asp Gln Ile Lys Arg Tyr Leu Glu Glu His Pro Glu Lys Gln
                85                  90                  95

Lys Ile Asn Phe Asn Gly Glu Gln Met Phe Asp Val Lys Glu Ala Ile
            100                 105                 110

Asp Thr Lys Asn His Gln Leu Asp Ser Lys Leu Phe Glu Tyr Phe Lys
        115                 120                 125

Glu Lys Ala Phe Pro Tyr Leu Ser Thr Lys His Leu Gly Val Phe Pro
130                 135                 140

Asp His Val Ile Asp Met Phe Ile Asn Gly Tyr Arg Leu Ser Leu Thr
145                 150                 155                 160

Asn His Gly Pro Thr Pro Val Lys Glu Gly Ser Lys Asp Pro Arg Gly
                165                 170                 175

Gly Ile Phe Asp Ala Val Phe Thr Arg Gly Asp Gln Ser Lys Leu Leu
            180                 185                 190

Thr Ser Arg His Asp Phe Lys Glu Lys Asn Leu Lys Glu Ile Ser Asp
        195                 200                 205
```

-continued

```
Leu Ile Lys Lys Glu Leu Thr Glu Gly Lys Ala Leu Gly Leu Ser His
            210                 215                 220

Thr Tyr Ala Asn Val Arg Ile Asn His Val Ile Asn Leu Trp Gly Ala
225                 230                 235                 240

Asp Phe Asp Ser Asn Gly Asn Leu Lys Ala Ile Tyr Val Thr Asp Ser
                245                 250                 255

Asp Ser Asn Ala Ser Ile Gly Met Lys Lys Tyr Phe Val Gly Val Asn
            260                 265                 270

Ser Ala Gly Lys Val Ala Ile Ser Ala Lys Glu Ile Lys Glu Asp Asn
        275                 280                 285

Ile Gly Ala Gln Val Leu Gly Leu Phe Thr Leu Ser Thr Gly Gln Asp
290                 295                 300

Ser Trp Asn Gln Thr Asn
305                 310

<210> SEQ ID NO 5
<211> LENGTH: 349
<212> TYPE: PRT
<213> ORGANISM: Streptococcus equi ssp. Zooepidemicus

<400> SEQUENCE: 5

Met Lys Thr Ile Ala Tyr Pro Asn Lys Pro His Ser Leu Ser Ala Gly
1               5                   10                  15

Leu Leu Thr Ala Ile Ala Ile Phe Ser Leu Ala Ser Ser Asn Ile Thr
            20                  25                  30

Tyr Ala Asp Asp Tyr Gln Arg Asn Ala Thr Glu Ala Tyr Ala Lys Glu
        35                  40                  45

Val Pro His Gln Ile Thr Ser Val Trp Thr Lys Gly Val Thr Pro Leu
    50                  55                  60

Thr Pro Glu Gln Phe Arg Tyr Asn Asn Glu Asp Val Ile His Ala Pro
65                  70                  75                  80

Tyr Leu Ala His Gln Gly Trp Tyr Asp Ile Thr Lys Ala Phe Asp Gly
                85                  90                  95

Lys Asp Asn Leu Leu Cys Gly Ala Ala Thr Ala Gly Asn Met Leu His
            100                 105                 110

Trp Trp Phe Asp Gln Asn Lys Thr Glu Ile Glu Ala Tyr Leu Ser Lys
        115                 120                 125

His Pro Glu Lys Gln Lys Ile Ile Phe Asn Asn Gln Glu Leu Phe Asp
    130                 135                 140

Leu Lys Ala Ala Ile Asp Thr Lys Asp Ser Gln Thr Asn Ser Gln Leu
145                 150                 155                 160

Phe Asn Tyr Phe Arg Asp Lys Ala Phe Pro Asn Leu Ser Ala Arg Gln
                165                 170                 175

Leu Gly Val Met Pro Asp Leu Val Leu Asp Met Phe Ile Asn Gly Tyr
            180                 185                 190

Tyr Leu Asn Val Phe Lys Thr Gln Ser Thr Asp Val Asn Arg Pro Tyr
        195                 200                 205

Gln Asp Lys Asp Lys Arg Gly Gly Ile Phe Asp Ala Val Phe Thr Arg
    210                 215                 220

Gly Asp Gln Thr Thr Leu Leu Thr Ala Arg His Asp Leu Lys Asn Lys
225                 230                 235                 240

Gly Leu Asn Asp Ile Ser Thr Ile Ile Lys Gln Glu Leu Thr Glu Gly
                245                 250                 255

Arg Ala Leu Ala Leu Ser His Thr Tyr Ala Asn Val Ser Ile Ser His
```

```
                260                 265                 270
Val Ile Asn Leu Trp Gly Ala Asp Phe Asn Ala Glu Gly Asn Leu Glu
            275                 280                 285

Ala Ile Tyr Val Thr Asp Ser Asp Ala Asn Ala Ser Ile Gly Met Lys
        290                 295                 300

Lys Tyr Phe Val Gly Ile Asn Ala His Gly His Val Ala Ile Ser Ala
305                 310                 315                 320

Lys Lys Ile Glu Gly Glu Asn Ile Gly Ala Gln Val Leu Gly Leu Phe
                325                 330                 335

Thr Leu Ser Ser Gly Lys Asp Ile Trp Gln Lys Leu Ser
            340                 345

<210> SEQ ID NO 6
<211> LENGTH: 339
<212> TYPE: PRT
<213> ORGANISM: Streptococcus pyogenes

<400> SEQUENCE: 6

Met Arg Lys Arg Cys Tyr Ser Thr Ser Ala Ala Val Leu Ala Ala Val
1               5                   10                  15

Thr Leu Phe Val Leu Ser Val Asp Arg Gly Val Ile Ala Asp Ser Phe
            20                  25                  30

Ser Ala Asn Gln Glu Ile Arg Tyr Ser Glu Val Thr Pro Tyr His Val
        35                  40                  45

Thr Ser Val Trp Thr Lys Gly Val Thr Pro Pro Ala Asn Phe Thr Gln
    50                  55                  60

Gly Glu Asp Val Phe His Ala Pro Tyr Val Ala Asn Gln Gly Trp Tyr
65                  70                  75                  80

Asp Ile Thr Lys Thr Phe Asn Gly Lys Asp Asp Leu Leu Cys Gly Ala
                85                  90                  95

Ala Thr Ala Gly Asn Met Leu His Trp Trp Phe Asp Gln Asn Lys Asp
            100                 105                 110

Gln Ile Lys Arg Tyr Leu Glu Glu His Pro Glu Lys Gln Lys Ile Asn
        115                 120                 125

Phe Asn Gly Glu Gln Met Phe Asp Val Lys Glu Ala Ile Asp Thr Lys
    130                 135                 140

Asn His Gln Leu Asp Ser Lys Leu Phe Glu Tyr Phe Lys Glu Lys Ala
145                 150                 155                 160

Phe Pro Tyr Leu Ser Thr Lys His Leu Gly Val Phe Pro Asp His Val
                165                 170                 175

Ile Asp Met Phe Ile Asn Gly Tyr Arg Leu Ser Leu Thr Asn His Gly
            180                 185                 190

Pro Thr Pro Val Lys Glu Gly Ser Lys Asp Pro Arg Gly Gly Ile Phe
        195                 200                 205

Asp Ala Val Phe Thr Arg Gly Asp Gln Ser Lys Leu Leu Thr Ser Arg
    210                 215                 220

His Asp Phe Lys Glu Lys Asn Leu Lys Glu Ile Ser Asp Leu Ile Lys
225                 230                 235                 240

Lys Glu Leu Thr Glu Gly Lys Ala Leu Gly Leu Ser His Thr Tyr Ala
                245                 250                 255

Asn Val Arg Ile Asn His Val Ile Asn Leu Trp Gly Ala Asp Phe Asp
            260                 265                 270

Ser Asn Gly Asn Leu Lys Ala Ile Tyr Val Thr Asp Ser Asp Ser Asn
        275                 280                 285
```

```
Ala Ser Ile Gly Met Lys Lys Tyr Phe Val Gly Val Asn Ser Ala Gly
            290                 295                 300

Lys Val Ala Ile Ser Ala Lys Glu Ile Lys Glu Asp Asn Ile Gly Ala
305                 310                 315                 320

Gln Val Leu Gly Leu Phe Thr Leu Ser Thr Gly Gln Asp Ser Trp Asn
                325                 330                 335

Gln Thr Asn

<210> SEQ ID NO 7
<211> LENGTH: 313
<212> TYPE: PRT
<213> ORGANISM: Streptococcus equi ssp. Zooepidemicus

<400> SEQUENCE: 7

Met Asp Asp Tyr Gln Arg Asn Ala Thr Glu Ala Tyr Ala Lys Glu Val
1               5                   10                  15

Pro His Gln Ile Thr Ser Val Trp Thr Lys Gly Val Thr Pro Pro Glu
                20                  25                  30

Gln Phe Thr Gln Gly Glu Asp Val Ile His Ala Pro Tyr Leu Ala His
            35                  40                  45

Gln Gly Trp Tyr Asp Ile Thr Lys Ala Phe Asp Gly Lys Asp Asn Leu
        50                  55                  60

Leu Cys Gly Ala Ala Thr Ala Gly Asn Met Leu His Trp Trp Phe Asp
65                  70                  75                  80

Gln Asn Lys Thr Glu Ile Glu Ala Tyr Leu Ser Lys His Pro Glu Lys
                85                  90                  95

Gln Lys Ile Ile Phe Arg Asn Gln Glu Leu Phe Asp Leu Lys Ala Ala
            100                 105                 110

Ile Asp Thr Lys Asp Ser Gln Thr Asn Ser Gln Leu Phe Asn Tyr Phe
        115                 120                 125

Arg Asp Lys Ala Phe Pro Asn Leu Ser Ala Arg Gln Leu Gly Val Met
130                 135                 140

Pro Asp Leu Val Leu Asp Met Phe Ile Asn Gly Tyr Tyr Leu Asn Val
145                 150                 155                 160

Phe Lys Thr Gln Ser Thr Asp Val Asn Arg Pro Tyr Gln Asp Lys Asp
                165                 170                 175

Lys Arg Gly Gly Ile Phe Asp Ala Val Phe Thr Arg Gly Asp Gln Thr
            180                 185                 190

Thr Leu Leu Thr Ala Arg His Asp Leu Lys Asn Lys Gly Leu Asn Asp
        195                 200                 205

Ile Ser Thr Ile Ile Lys Gln Glu Leu Thr Glu Gly Arg Ala Leu Ala
210                 215                 220

Leu Ser His Thr Tyr Ala Asn Val Ser Ile Ser His Val Ile Asn Leu
225                 230                 235                 240

Trp Gly Ala Asp Phe Asn Ala Glu Gly Asn Leu Glu Ala Ile Tyr Val
                245                 250                 255

Thr Asp Ser Asp Ala Asn Ala Ser Ile Gly Met Lys Lys Tyr Phe Val
            260                 265                 270

Gly Ile Asn Ala His Gly His Val Ala Ile Ser Ala Lys Lys Ile Glu
        275                 280                 285

Gly Glu Asn Ile Gly Ala Gln Val Leu Gly Leu Phe Thr Leu Ser Ser
290                 295                 300

Gly Lys Asp Ile Trp Gln Lys Leu Ser
305                 310
```

<210> SEQ ID NO 8
<211> LENGTH: 313
<212> TYPE: PRT
<213> ORGANISM: Streptococcus equi ssp. Zooepidemicus

<400> SEQUENCE: 8

```
Met Asp Asp Tyr Gln Arg Asn Ala Thr Glu Ala Tyr Ala Lys Glu Val
1               5                   10                  15

Pro His Gln Ile Thr Ser Val Trp Thr Lys Gly Val Thr Pro Pro Glu
            20                  25                  30

Gln Phe Thr Gln Gly Glu Asp Val Ile His Ala Pro Tyr Leu Ala His
        35                  40                  45

Gln Gly Trp Tyr Asp Ile Thr Lys Ala Phe Asp Gly Lys Asp Asn Leu
    50                  55                  60

Leu Cys Gly Ala Ala Thr Ala Gly Asn Met Leu His Trp Trp Phe Asp
65                  70                  75                  80

Gln Asn Lys Thr Glu Ile Glu Ala Tyr Leu Ser Lys His Pro Glu Lys
                85                  90                  95

Gln Lys Ile Ile Phe Arg Asn Gln Glu Leu Phe Asp Leu Lys Ala Ala
            100                 105                 110

Ile Asp Thr Lys Asp Ser Gln Thr Asn Ser Gln Leu Phe Asn Tyr Phe
        115                 120                 125

Arg Asp Lys Ala Phe Pro Asn Leu Ser Ala Arg Gln Leu Gly Val Met
    130                 135                 140

Pro Asp Leu Val Leu Asp Met Phe Ile Asn Gly Tyr Tyr Leu Asn Val
145                 150                 155                 160

Phe Lys Thr Gln Ser Thr Asp Val Asn Arg Pro Tyr Gln Asp Lys Asp
                165                 170                 175

Lys Arg Gly Gly Ile Phe Asp Ala Val Phe Thr Arg Gly Asn Gln Thr
            180                 185                 190

Thr Leu Leu Thr Ala Arg His Asp Leu Lys Asn Lys Gly Leu Asn Asp
        195                 200                 205

Ile Ser Thr Ile Ile Lys Gln Glu Leu Thr Glu Gly Arg Ala Leu Ala
    210                 215                 220

Leu Ser His Thr Tyr Ala Asn Val Ser Ile Ser His Val Ile Asn Leu
225                 230                 235                 240

Trp Gly Ala Asp Phe Asn Ala Glu Gly Asn Leu Glu Ala Ile Tyr Val
                245                 250                 255

Thr Asp Ser Asp Ala Asn Ala Ser Ile Gly Met Lys Lys Tyr Phe Val
            260                 265                 270

Gly Ile Asn Ala His Gly His Val Ala Ile Ser Ala Lys Lys Ile Glu
        275                 280                 285

Gly Glu Asn Ile Gly Ala Gln Val Leu Gly Leu Phe Thr Leu Ser Ser
    290                 295                 300

Gly Lys Asp Ile Trp Gln Lys Leu Ser
305                 310
```

<210> SEQ ID NO 9
<211> LENGTH: 322
<212> TYPE: PRT
<213> ORGANISM: Streptococcus equi ssp. Zooepidemicus

<400> SEQUENCE: 9

```
Met Asp Asp Tyr Gln Arg Asn Ala Thr Glu Ala Tyr Ala Lys Glu Val
1               5                   10                  15
```

-continued

```
Pro His Gln Ile Thr Ser Val Trp Thr Lys Gly Val Thr Pro Pro Glu
            20                  25                  30

Gln Phe Thr Gln Gly Glu Asp Val Ile His Ala Pro Tyr Leu Ala His
        35                  40                  45

Gln Gly Trp Tyr Asp Ile Thr Lys Ala Phe Asn Gly Lys Asp Asp Leu
    50                  55                  60

Leu Cys Gly Ala Ala Thr Ala Gly Asn Met Leu His Trp Trp Phe Asp
65                  70                  75                  80

Gln Asn Lys Thr Glu Ile Glu Ala Tyr Leu Ser Lys His Pro Glu Lys
                85                  90                  95

Gln Lys Ile Ile Phe Arg Asn Gln Glu Leu Phe Asp Leu Lys Ala Ala
            100                 105                 110

Ile Asp Thr Lys Asp Ser Gln Thr Asn Ser Gln Leu Phe Asn Tyr Phe
        115                 120                 125

Arg Asp Lys Ala Phe Pro Asn Leu Ser Ala Arg Gln Leu Gly Val Met
    130                 135                 140

Pro Asp Leu Val Leu Asp Met Phe Ile Asn Gly Tyr Tyr Leu Asn Val
145                 150                 155                 160

Phe Lys Thr Gln Ser Thr Asp Val Asn Arg Pro Tyr Gln Asp Lys Asp
                165                 170                 175

Lys Arg Gly Gly Ile Phe Asp Ala Val Phe Thr Arg Gly Asn Gln Thr
            180                 185                 190

Thr Leu Leu Thr Ala Arg His Asp Leu Lys Asn Lys Gly Leu Asn Asp
        195                 200                 205

Ile Ser Thr Ile Ile Lys Gln Glu Leu Thr Glu Gly Arg Ala Leu Ala
    210                 215                 220

Leu Ser His Thr Tyr Ala Asn Val Ser Ile Ser His Val Ile Asn Leu
225                 230                 235                 240

Trp Gly Ala Asp Phe Asn Ala Glu Gly Asn Leu Glu Ala Ile Tyr Val
                245                 250                 255

Thr Asp Ser Asp Ala Asn Ala Ser Ile Gly Met Lys Lys Tyr Phe Val
            260                 265                 270

Gly Ile Asn Ala His Gly His Val Ala Ile Ser Ala Lys Lys Ile Glu
        275                 280                 285

Gly Glu Asn Ile Gly Ala Gln Val Leu Gly Leu Phe Thr Leu Ser Ser
    290                 295                 300

Gly Lys Asp Ile Trp Gln Lys Leu Ser Gly Gly His His His
305                 310                 315                 320

His His

<210> SEQ ID NO 10
<211> LENGTH: 313
<212> TYPE: PRT
<213> ORGANISM: Streptococcus equi ssp. Zooepidemicus

<400> SEQUENCE: 10

Met Asp Asp Tyr Gln Arg Asn Ala Thr Glu Ala Tyr Ala Lys Glu Val
1               5                   10                  15

Pro His Gln Ile Thr Ser Val Trp Thr Lys Gly Val Thr Pro Pro Glu
            20                  25                  30

Gln Phe Thr Gln Gly Glu Asp Val Ile His Ala Pro Tyr Leu Ala His
        35                  40                  45

Gln Gly Trp Tyr Asp Ile Thr Lys Ala Phe Asn Gly Lys Asp Asp Leu
    50                  55                  60
```

Leu Cys Gly Ala Ala Thr Ala Gly Asn Met Leu His Trp Trp Phe Asp
65                  70                  75                  80

Gln Asn Lys Thr Glu Ile Glu Ala Tyr Leu Ser Lys His Pro Glu Lys
                85                  90                  95

Gln Lys Ile Ile Phe Arg Asn Gln Glu Leu Phe Asp Leu Lys Ala Ala
            100                 105                 110

Ile Asp Thr Lys Asp Ser Gln Thr Asn Ser Gln Leu Phe Asn Tyr Phe
        115                 120                 125

Arg Asp Lys Ala Phe Pro Asn Leu Ser Ala Arg Gln Leu Gly Val Met
130                 135                 140

Pro Asp Leu Val Leu Asp Met Phe Ile Asn Gly Tyr Tyr Leu Asn Val
145                 150                 155                 160

Phe Lys Thr Gln Ser Thr Asp Val Asn Arg Pro Tyr Gln Asp Lys Asp
                165                 170                 175

Lys Arg Gly Gly Ile Phe Asp Ala Val Phe Thr Arg Gly Asn Gln Thr
            180                 185                 190

Thr Leu Leu Thr Ala Arg His Asp Leu Lys Asn Lys Gly Leu Asn Asp
        195                 200                 205

Ile Ser Thr Ile Ile Lys Gln Glu Leu Thr Glu Gly Arg Ala Leu Ala
210                 215                 220

Leu Ser His Thr Tyr Ala Asn Val Ser Ile Ser His Val Ile Asn Leu
225                 230                 235                 240

Trp Gly Ala Asp Phe Asn Ala Glu Gly Asn Leu Glu Ala Ile Tyr Val
                245                 250                 255

Thr Asp Ser Asp Ala Asn Ala Ser Ile Gly Met Lys Lys Tyr Phe Val
            260                 265                 270

Gly Ile Asn Ala His Gly His Val Ala Ile Ser Ala Lys Lys Ile Glu
        275                 280                 285

Gly Glu Asn Ile Gly Ala Gln Val Leu Gly Leu Phe Thr Leu Ser Ser
290                 295                 300

Gly Lys Asp Ile Trp Gln Lys Leu Ser
305                 310

<210> SEQ ID NO 11
<211> LENGTH: 302
<212> TYPE: PRT
<213> ORGANISM: Streptococcus equi ssp. Zooepidemicus

<400> SEQUENCE: 11

Met Ser Val Trp Thr Lys Gly Val Thr Pro Glu Gln Phe Thr Gln
1               5                   10                  15

Gly Glu Asp Val Ile His Ala Pro Tyr Leu Ala His Gln Gly Trp Tyr
                20                  25                  30

Asp Ile Thr Lys Ala Phe Asn Gly Lys Asp Asp Leu Leu Cys Gly Ala
            35                  40                  45

Ala Thr Ala Gly Asn Met Leu His Trp Trp Phe Asp Gln Asn Lys Thr
        50                  55                  60

Glu Ile Glu Ala Tyr Leu Ser Lys His Pro Glu Lys Gln Lys Ile Ile
65                  70                  75                  80

Phe Arg Asn Gln Glu Leu Phe Asp Leu Lys Ala Ala Ile Asp Thr Lys
                85                  90                  95

Asp Ser Gln Thr Asn Ser Gln Leu Phe Asn Tyr Phe Arg Asp Lys Ala
            100                 105                 110

Phe Pro Asn Leu Ser Ala Arg Gln Leu Gly Val Met Pro Asp Leu Val
        115                 120                 125

```
Leu Asp Met Phe Ile Asn Gly Tyr Tyr Leu Asn Val Phe Lys Thr Gln
        130                 135                 140

Ser Thr Asp Val Asn Arg Pro Tyr Gln Asp Lys Asp Lys Arg Gly Gly
145                 150                 155                 160

Ile Phe Asp Ala Val Phe Thr Arg Gly Asn Gln Thr Thr Leu Leu Thr
                165                 170                 175

Ala Arg His Asp Leu Lys Asn Lys Gly Leu Asn Asp Ile Ser Thr Ile
            180                 185                 190

Ile Lys Gln Glu Leu Thr Glu Gly Arg Ala Leu Ala Leu Ser His Thr
        195                 200                 205

Tyr Ala Asn Val Ser Ile Ser His Val Ile Asn Leu Trp Gly Ala Asp
210                 215                 220

Phe Asn Ala Glu Gly Asn Leu Glu Ala Ile Tyr Val Thr Asp Ser Asp
225                 230                 235                 240

Ala Asn Ala Ser Ile Gly Met Lys Lys Tyr Phe Val Gly Ile Asn Ala
                245                 250                 255

His Gly His Val Ala Ile Ser Ala Lys Lys Ile Glu Gly Glu Asn Ile
            260                 265                 270

Gly Ala Gln Val Leu Gly Leu Phe Thr Leu Ser Ser Gly Lys Asp Ile
        275                 280                 285

Trp Gln Lys Leu Ser Gly Gly Gly His His His His His His
290                 295                 300

<210> SEQ ID NO 12
<211> LENGTH: 322
<212> TYPE: PRT
<213> ORGANISM: Streptococcus equi ssp. Zooepidemicus

<400> SEQUENCE: 12

Met Asp Asp Tyr Gln Arg Asn Ala Thr Glu Ala Tyr Ala Lys Glu Val
1               5                   10                  15

Pro His Gln Ile Thr Ser Val Trp Thr Lys Gly Val Thr Pro Pro Glu
            20                  25                  30

Gln Phe Thr Gln Gly Glu Asp Val Ile His Ala Pro Tyr Leu Ala His
        35                  40                  45

Gln Gly Trp Tyr Asp Ile Thr Lys Ala Phe Asn Gly Lys Asp Asp Leu
    50                  55                  60

Leu Gly Gly Ala Ala Thr Ala Gly Asn Met Leu His Trp Trp Phe Asp
65                  70                  75                  80

Gln Asn Lys Thr Glu Ile Glu Ala Tyr Leu Ser Lys His Pro Glu Lys
                85                  90                  95

Gln Lys Ile Ile Phe Arg Asn Gln Glu Leu Phe Asp Leu Lys Ala Ala
            100                 105                 110

Ile Asp Thr Lys Asp Ser Gln Thr Asn Ser Gln Leu Phe Asn Tyr Phe
        115                 120                 125

Arg Asp Lys Ala Phe Pro Asn Leu Ser Ala Arg Gln Leu Gly Val Met
    130                 135                 140

Pro Asp Leu Val Leu Asp Met Phe Ile Asn Gly Tyr Tyr Leu Asn Val
145                 150                 155                 160

Phe Lys Thr Gln Ser Thr Asp Val Asn Arg Pro Tyr Gln Asp Lys Asp
                165                 170                 175

Lys Arg Gly Gly Ile Phe Asp Ala Val Phe Thr Arg Gly Asn Gln Thr
            180                 185                 190

Thr Leu Leu Thr Ala Arg His Asp Leu Lys Asn Lys Gly Leu Asn Asp
```

```
            195                 200                 205
Ile Ser Thr Ile Ile Lys Gln Glu Leu Thr Glu Gly Arg Ala Leu Ala
210                 215                 220

Leu Ser His Thr Tyr Ala Asn Val Ser Ile Ser His Val Ile Asn Leu
225                 230                 235                 240

Trp Gly Ala Asp Phe Asn Ala Glu Gly Asn Leu Glu Ala Ile Tyr Val
                245                 250                 255

Thr Asp Ser Asp Ala Asn Ala Ser Ile Gly Met Lys Lys Tyr Phe Val
                260                 265                 270

Gly Ile Asn Ala His Gly His Val Ala Ile Ser Ala Lys Lys Ile Glu
                275                 280                 285

Gly Glu Asn Ile Gly Ala Gln Val Leu Gly Leu Phe Thr Leu Ser Ser
                290                 295                 300

Gly Lys Asp Ile Trp Gln Lys Leu Ser Gly Gly Gly His His His His
305                 310                 315                 320

His His

<210> SEQ ID NO 13
<211> LENGTH: 320
<212> TYPE: PRT
<213> ORGANISM: Streptococcus pyogenes

<400> SEQUENCE: 13

Met Asp Ser Phe Ser Ala Asn Gln Glu Ile Arg Tyr Ser Glu Val Thr
1               5                   10                  15

Pro Tyr His Val Thr Ser Val Trp Thr Lys Gly Val Thr Pro Pro Ala
                20                  25                  30

Asn Phe Thr Gln Gly Glu Asp Val Phe His Ala Pro Tyr Val Ala Asn
                35                  40                  45

Gln Gly Trp Tyr Asp Ile Thr Lys Thr Phe Asn Gly Lys Asp Asp Leu
    50                  55                  60

Leu Cys Gly Ala Ala Thr Ala Gly Asn Met Leu His Trp Trp Phe Asp
65                  70                  75                  80

Gln Asn Lys Asp Gln Ile Lys Arg Tyr Leu Glu Glu His Pro Glu Lys
                85                  90                  95

Gln Lys Ile Asn Phe Asn Gly Glu Gln Met Phe Asp Val Lys Glu Ala
            100                 105                 110

Ile Asp Thr Lys Asn His Gln Leu Asp Ser Lys Leu Phe Glu Tyr Phe
        115                 120                 125

Lys Glu Lys Ala Phe Pro Tyr Leu Ser Thr Lys His Leu Gly Val Phe
130                 135                 140

Pro Asp His Val Ile Asp Met Phe Ile Asn Gly Tyr Arg Leu Ser Leu
145                 150                 155                 160

Thr Asn His Gly Pro Thr Pro Val Lys Glu Gly Ser Lys Asp Pro Arg
                165                 170                 175

Gly Gly Ile Phe Asp Ala Val Phe Thr Arg Gly Asp Gln Ser Lys Leu
            180                 185                 190

Leu Thr Ser Arg His Asp Phe Lys Glu Lys Asn Leu Lys Glu Ile Ser
        195                 200                 205

Asp Leu Ile Lys Lys Glu Leu Thr Glu Gly Lys Ala Leu Gly Leu Ser
    210                 215                 220

His Thr Tyr Ala Asn Val Arg Ile Asn His Val Ile Asn Leu Trp Gly
225                 230                 235                 240

Ala Asp Phe Asp Ser Asn Gly Asn Leu Lys Ala Ile Tyr Val Thr Asp
```

245                 250                 255
Ser Asp Ser Asn Ala Ser Ile Gly Met Lys Lys Tyr Phe Val Gly Val
            260                 265                 270

Asn Ser Ala Gly Lys Val Ala Ile Ser Ala Lys Glu Ile Lys Glu Asp
        275                 280                 285

Asn Ile Gly Ala Gln Val Leu Gly Leu Phe Thr Leu Ser Thr Gly Gln
    290                 295                 300

Asp Ser Trp Asn Gln Thr Asn Gly Gly Gly His His His His His His
305                 310                 315                 320

<210> SEQ ID NO 14
<211> LENGTH: 325
<212> TYPE: PRT
<213> ORGANISM: Streptococcus equi ssp. Zooepidemicus

<400> SEQUENCE: 14

Met Asp Asp Tyr Gln Arg Asn Ala Thr Glu Ala Tyr Ala Lys Glu Val
1               5                   10                  15

Pro His Gln Ile Thr Ser Val Trp Thr Lys Gly Val Thr Pro Leu Thr
            20                  25                  30

Pro Glu Gln Phe Arg Tyr Asn Asn Glu Asp Val Ile His Ala Pro Tyr
        35                  40                  45

Leu Ala His Gln Gly Trp Tyr Asp Ile Thr Lys Ala Phe Asp Gly Lys
    50                  55                  60

Asp Asn Leu Leu Cys Gly Ala Ala Thr Ala Gly Asn Met Leu His Trp
65                  70                  75                  80

Trp Phe Asp Gln Asn Lys Thr Glu Ile Glu Ala Tyr Leu Ser Lys His
                85                  90                  95

Pro Glu Lys Gln Lys Ile Ile Phe Asn Asn Gln Glu Leu Phe Asp Leu
            100                 105                 110

Lys Ala Ala Ile Asp Thr Lys Asp Ser Gln Thr Asn Ser Gln Leu Phe
        115                 120                 125

Asn Tyr Phe Arg Asp Lys Ala Phe Pro Asn Leu Ser Ala Arg Gln Leu
    130                 135                 140

Gly Val Met Pro Asp Leu Val Leu Asp Met Phe Ile Asn Gly Tyr Tyr
145                 150                 155                 160

Leu Asn Val Phe Lys Thr Gln Ser Thr Asp Val Asn Arg Pro Tyr Gln
                165                 170                 175

Asp Lys Asp Lys Arg Gly Gly Ile Phe Asp Ala Val Phe Thr Arg Gly
            180                 185                 190

Asp Gln Thr Thr Leu Leu Thr Ala Arg His Asp Leu Lys Asn Lys Gly
        195                 200                 205

Leu Asn Asp Ile Ser Thr Ile Ile Lys Gln Glu Leu Thr Glu Gly Arg
    210                 215                 220

Ala Leu Ala Leu Ser His Thr Tyr Ala Asn Val Ser Ile Ser His Val
225                 230                 235                 240

Ile Asn Leu Trp Gly Ala Asp Phe Asn Ala Glu Gly Asn Leu Glu Ala
                245                 250                 255

Ile Tyr Val Thr Asp Ser Asp Ala Asn Ala Ser Ile Gly Met Lys Lys
            260                 265                 270

Tyr Phe Val Gly Ile Asn Ala His Gly His Val Ala Ile Ser Ala Lys
        275                 280                 285

Lys Ile Glu Gly Glu Asn Ile Gly Ala Gln Val Leu Gly Leu Phe Thr
    290                 295                 300

```
Leu Ser Ser Gly Lys Asp Ile Trp Gln Lys Leu Ser Gly Gly Gly His
305                 310                 315                 320

His His His His His
            325

<210> SEQ ID NO 15
<211> LENGTH: 20
<212> TYPE: PRT
<213> ORGANISM: Streptococcus equi ssp. Zooepidemicus

<400> SEQUENCE: 15

Asp Asp Tyr Gln Arg Asn Ala Thr Glu Ala Tyr Ala Lys Glu Val Pro
1               5                   10                  15

His Gln Ile Thr
        20

<210> SEQ ID NO 16
<211> LENGTH: 969
<212> TYPE: DNA
<213> ORGANISM: Streptococcus equi ssp. Zooepidemicus

<400> SEQUENCE: 16
atggacgatt accaaggaa tgctacggaa gcttatgcca agaagtacc acatcagatc      60 acttctgtat ggaccaaagg tgttacacca cccgagcagt ttactcaagg tgaagatgtg    120
atccatgcgc catatcttgc tcatcaaggc tggtacgata tcaccaaggc cttcgatggg   180
aaggataatc tcttgtgtgg cgcagcaacg gcaggtaata tgctgcattg gtggtttgat    240
caaaataaaa cagagattga agcctattta agtaaacacc ctgaaaagca aaaaatcatt    300
tttcgtaacc aagagctatt tgatttgaaa gctgctatcg ataccaagga cagtcaaacc    360
aatagtcagc tttttaatta ttttagagat aaagcctttc caaatctatc agcacgtcaa    420
ctcggggtta tgcctgatct tgttctagat atgtttatca atggttacta cttaaatgtg    480
tttaaaacac agtctactga tgtcaatcga ccttatcagg acaaggacaa acgaggtggt    540
attttcgatg ctgttttcac cagaggagat cagacaacgc tcttgacagc tcgtcatgat    600
ttaaaaaata aaggactaaa tgacatcagc accattatca gcaagaact gactgaagga    660 agagcccttg ctttatcaca tacctacgcc aatgttagca ttagccatgt gattaacttg    720
tggggagctg attttaatgc tgaaggaaac cttgaggcca tctatgtcac agactcagat    780
gctaatgcgt ctattggtat gaaaaaatat tttgtcggca ttaatgctca tggacatgtc    840
gccatttctg ccaagaaaat agaaggagaa acattggcg ctcaagtatt aggcttattt    900
acgctttcca gtggcaagga catttggcag aaactgagcg gcggtggcca tcatcaccat    960
caccactaa                                                           969

<210> SEQ ID NO 17
<211> LENGTH: 969
<212> TYPE: DNA
<213> ORGANISM: Streptococcus equi ssp. Zooepidemicus

<400> SEQUENCE: 17
atggacgatt accaaggaa tgctacggaa gcttatgcca agaagtacc acatcagatc      60 acttctgtat ggaccaaagg tgttacacca cccgagcagt ttactcaagg tgaagatgtg    120
atccatgcgc catatcttgc tcatcaaggc tggtacgata tcaccaaggc cttcgatggg   180
aaggataatc tcttgtgtgg cgcagcaacg gcaggtaata tgctgcattg gtggtttgat    240
caaaataaaa cagagattga agcctattta agtaaacacc ctgaaaagca aaaaatcatt    300
```

```
tttcgtaacc aagagctatt tgatttgaaa gctgctatcg ataccaagga cagtcaaacc    360
aatagtcagc tttttaatta ttttagagat aaagcctttc caaatctatc agcacgtcaa    420
ctcggggtta tgcctgatct tgttctagat atgtttatca atggttacta cttaaatgtg    480
tttaaaacac agtctactga tgtcaatcga ccttatcagg acaaggacaa acgaggtggt    540
attttcgatg ctgttttcac cagaggaaac cagacaacgc tcttgacagc tcgtcatgat    600
ttaaaaaata aaggactaaa tgacatcagc accattatca agcaagaact gactgaagga    660
agagcccttg ctttatcaca tacctacgcc aatgttagca ttagccatgt gattaacttg    720
tggggagctg attttaatgc tgaaggaaac cttgaggcca tctatgtcac agactcagat    780
gctaatgcgt ctattggtat gaaaaaatat tttgtcggca ttaatgctca tggacatgtc    840
gccatttctg ccaagaaaat agaaggagaa acattggcg ctcaagtatt aggcttattt    900
acgctttcca gtggcaagga catttggcag aaactgagcg gcggtggcca tcatcaccat    960
caccactaa                                                            969

<210> SEQ ID NO 18
<211> LENGTH: 969
<212> TYPE: DNA
<213> ORGANISM: Streptococcus equi ssp. Zooepidemicus

<400> SEQUENCE: 18
atggacgatt accaaaggaa tgctacggaa gcttatgcca agaagtacc acatcagatc       60 acttctgtat ggaccaaagg tgttacacca cccgagcagt ttactcaagg tgaagatgtg    120
atccatgcgc catatcttgc tcatcaaggc tggtacgata tcaccaaggc cttcaatggg    180
aaggatgatc tcttgtgtgg cgcagcaacg gcaggtaata tgctgcattg gtggtttgat    240
caaaataaaa cagagattga agcctattta agtaaacacc ctgaaaagca aaaaatcatt    300
tttcgtaacc aagagctatt tgatttgaaa gctgctatcg ataccaagga cagtcaaacc    360
aatagtcagc tttttaatta ttttagagat aaagcctttc caaatctatc agcacgtcaa    420
ctcggggtta tgcctgatct tgttctagat atgtttatca atggttacta cttaaatgtg    480
tttaaaacac agtctactga tgtcaatcga ccttatcagg acaaggacaa acgaggtggt    540
attttcgatg ctgttttcac cagaggaaac cagacaacgc tcttgacagc tcgtcatgat    600
ttaaaaaata aaggactaaa tgacatcagc accattatca agcaagaact gactgaagga    660
agagcccttg ctttatcaca tacctacgcc aatgttagca ttagccatgt gattaacttg    720
tggggagctg attttaatgc tgaaggaaac cttgaggcca tctatgtcac agactcagat    780
gctaatgcgt ctattggtat gaaaaaatat tttgtcggca ttaatgctca tggacatgtc    840
gccatttctg ccaagaaaat agaaggagaa acattggcg ctcaagtatt aggcttattt    900
acgctttcca gtggcaagga catttggcag aaactgagcg gcggtggcca tcatcaccat    960
caccactaa                                                            969

<210> SEQ ID NO 19
<211> LENGTH: 942
<212> TYPE: DNA
<213> ORGANISM: Streptococcus equi ssp. Zooepidemicus

<400> SEQUENCE: 19
atggacgatt accaaaggaa tgctacggaa gcttatgcca agaagtacc acatcagatc       60 acttctgtat ggaccaaagg tgttacacca cccgagcagt ttactcaagg tgaagatgtg    120
```

```
atccatgcgc catatcttgc tcatcaaggc tggtacgata tcaccaaggc cttcaatggg      180
aaggatgatc tcttgtgtgg cgcagcaacg gcaggtaata tgctgcattg gtggtttgat      240
caaaataaaa cagagattga agcctattta agtaaacacc ctgaaaagca aaaaatcatt      300
tttcgtaacc aagagctatt tgatttgaaa gctgctatcg ataccaagga cagtcaaacc      360
aatagtcagc tttttaatta ttttagagat aaagcctttc caaatctatc agcacgtcaa      420 ctcgggggtta tgcctgatct tgttctagat atgtttatca atggttacta cttaaatgtg      480
tttaaaacac agtctactga tgtcaatcga ccttatcagg acaaggacaa acgaggtggt      540
attttcgatg ctgttttcac cagaggaaac cagacaacgc tcttgacagc tcgtcatgat      600
ttaaaaaata aaggactaaa tgacatcagc accattatca agcaagaact gactgaagga      660
agagcccttg ctttatcaca tacctacgcc aatgttagca ttagccatgt gattaacttg      720
tggggagctg attttaatgc tgaaggaaac cttgaggcca tctatgtcac agactcagat      780
gctaatgcgt ctattggtat gaaaaaatat tttgtcggca ttaatgctca tggacatgtc      840
gccatttctg ccaagaaaat agaaggagaa acattggcg ctcaagtatt aggcttattt      900
acgctttcca gtggcaagga catttggcag aaactgagct aa                        942

<210> SEQ ID NO 20
<211> LENGTH: 909
<212> TYPE: DNA
<213> ORGANISM: Streptococcus equi ssp. Zooepidemicus

<400> SEQUENCE: 20
atgtctgtat ggaccaaagg tgttacacca cccgagcagt ttactcaagg tgaagatgtg       60
atccatgcgc catatcttgc tcatcaaggc tggtacgata tcaccaaggc cttcaatggg      120
aaggatgatc tcttgtgtgg cgcagcaacg gcaggtaata tgctgcattg gtggtttgat      180
caaaataaaa cagagattga agcctattta agtaaacacc ctgaaaagca aaaaatcatt      240
tttcgtaacc aagagctatt tgatttgaaa gctgctatcg ataccaagga cagtcaaacc      300
aatagtcagc tttttaatta ttttagagat aaagcctttc caaatctatc agcacgtcaa      360 ctcgggggtta tgcctgatct tgttctagat atgtttatca atggttacta cttaaatgtg      420
tttaaaacac agtctactga tgtcaatcga ccttatcagg acaaggacaa acgaggtggt      480
attttcgatg ctgttttcac cagaggaaac cagacaacgc tcttgacagc tcgtcatgat      540
ttaaaaaata aaggactaaa tgacatcagc accattatca agcaagaact gactgaagga      600
agagcccttg ctttatcaca tacctacgcc aatgttagca ttagccatgt gattaacttg      660
tggggagctg attttaatgc tgaaggaaac cttgaggcca tctatgtcac agactcagat      720
gctaatgcgt ctattggtat gaaaaaatat tttgtcggca ttaatgctca tggacatgtc      780
gccatttctg ccaagaaaat agaaggagaa acattggcg ctcaagtatt aggcttattt      840
acgctttcca gtggcaagga catttggcag aaactgagcg gcggtggcca tcatcaccat      900
caccactaa                                                             909

<210> SEQ ID NO 21
<211> LENGTH: 969
<212> TYPE: DNA
<213> ORGANISM: Streptococcus equi ssp. Zooepidemicus

<400> SEQUENCE: 21
atggacgatt accaaaggaa tgctacggaa gcttatgcca aagaagtacc acatcagatc       60
acttctgtat ggaccaaagg tgttacacca cccgagcagt ttactcaagg tgaagatgtg      120
```

```
atccatgcgc catatcttgc tcatcaaggc tggtacgata tcaccaaggc cttcaatggg      180
aaggatgatc tcttgggtgg cgcagcaacg gcaggtaata tgctgcattg gtggtttgat      240
caaaataaaa cagagattga agcctattta agtaaacacc ctgaaaagca aaaaatcatt      300
tttcgtaacc aagagctatt tgatttgaaa gctgctatcg ataccaagga cagtcaaacc      360
aatagtcagc ttttaattta ttttagagat aaagcctttc caaatctatc agcacgtcaa      420
ctcggggtta tgcctgatct tgttctagat atgtttatca atggttacta cttaaatgtg      480
tttaaaacac agtctactga tgtcaatcga ccttatcagg acaaggacaa acgaggtggt      540
attttcgatg ctgttttcac cagaggaaac cagacaacgc tcttgacagc tcgtcatgat      600
ttaaaaaata aaggactaaa tgacatcagc accattatca agcaagaact gactgaagga      660
agagcccttg cttatcaca tacctacgcc aatgttagca ttagccatgt gattaacttg      720
tggggagctg attttaatgc tgaaggaaac cttgaggcca tctatgtcac agactcagat      780
gctaatgcgt ctattggtat gaaaaaatat tttgtcggca ttaatgctca tggacatgtc      840
gccatttctg ccaagaaaat agaaggagaa acattggcg ctcaagtatt aggcttattt      900
acgctttcca gtggcaagga catttggcag aaactgagcg gcggtggcca tcatcaccat      960
caccactaa                                                             969

<210> SEQ ID NO 22
<211> LENGTH: 963
<212> TYPE: DNA
<213> ORGANISM: Streptococcus pyogenes

<400> SEQUENCE: 22
atggatagtt tttctgctaa tcaagagatt agatattcgg aagtaacacc ttatcacgtt       60
acttccgttt ggaccaaagg agttactcct ccagcaaact tcactcaagg tgaagatgtt      120
tttcacgctc cttatgttgc taaccaagga tggtatgata ttaccaaaac attcaatgga      180
aaagacgatc ttctttgcgg ggctgccaca gcagggaata tgcttcactg gtggttcgat      240
caaaacaaag accaaattaa acgttatttg gaagagcatc cagaaaagca aaaaataaac      300
ttcaatggcg aacagatgtt tgacgtaaaa gaagctatcg acactaaaaa ccaccagcta      360
gatagtaaat tatttgaata ttttaaagaa aaagcctttcc cttatctatc tactaaacac      420
ctaggagttt ccctgatca tgtaattgat atgttcatta acggctaccg ccttagtcta      480
actaaccacg gtccaacgcc agtaaagaa ggtagtaaag atccccgagg tggtattttt      540
gacgccgtat ttacaagagg tgatcaaagt aagctattga caagtcgtca tgattttaaa      600
gaaaaaaatc tcaaagaaat cagtgatctc attaagaaag agttaaccga aggcaaggct      660
ctaggcctat cacacaccta cgctaacgta cgcatcaacc atgttataaa cctgtgggga      720
gctgactttg attctaacgg gaaccttaaa gctatttatg taacagactc tgatagtaat      780
gcatctattg gtatgaagaa atactttgtt ggtgttaatt ccgctggaaa agtagctatt      840
tctgctaaag aaataaaaga agataatata ggtgctcaag tactagggtt atttacactt      900
tcaacagggc aagatagttg gaatcagacc aatggcggtg ccatcatca ccatcaccac      960 taa                                                                   963

<210> SEQ ID NO 23
<211> LENGTH: 978
<212> TYPE: DNA
<213> ORGANISM: Streptococcus equi ssp. Zooepidemicus
```

```
<400> SEQUENCE: 23
atggacgatt accaaaggaa tgctacggaa gcttatgcca aagaagtacc acatcagatc        60
acttctgtat ggaccaaagg tgttacacca ctaacacccg agcagtttcg atataataac       120
gaagatgtga tccatgcgcc atatcttgct catcaaggct ggtacgatat caccaaggcc       180
ttcgatggga aggataatct cttgtgtggc gcagcaacgg caggtaatat gctgcattgg       240
tggtttgatc aaaataaaac agagattgaa gcctatttaa gtaaacaccc tgaaaagcaa       300
aaaatcattt taacaacca agagctattt gatttgaaag ctgctatcga taccaaggac        360
agtcaaacca atagtcagct tttaattat tttagagata aagcctttcc aaatctatca        420
gcacgtcaac tcggggttat gcctgatctt gttctagata tgtttatcaa tggttactac       480
ttaaatgtgt taaaacaca gtctactgat gtcaatcgac cttatcagga caaggacaaa        540
cgaggtggta ttttcgatgc tgttttcacc agaggagatc agacaacgct cttgacagct       600
cgtcatgatt aaaaaataa aggactaaat gacatcagca ccattatcaa gcaagaactg        660
actgaaggaa gagcccttgc tttatcacat acctacgcca atgttagcat tagccatgtg       720
attaacttgt ggggagctga ttttaatgct gaaggaaacc ttgaggccat ctatgtcaca       780
gactcagatg ctaatgcgtc tattggtatg aaaaaatatt ttgtcggcat taatgctcat       840
ggacatgtcg ccatttctgc caagaaaata gaaggagaaa acattggcgc tcaagtatta       900
ggcttattta cgctttccag tggcaaggac atttggcaga aactgagcgg cggtggccat       960
catcaccatc accactaa                                                      978
```

CYSTEINE PROTEASE

CROSS-REFERENCE TO RELATED APPLICATIONS

This application is a national phase application under 35 U.S.C. § 371 that claims priority to International Application No. PCT/EP2021/063131 filed May 18, 2021, which claims priority to Great Britain Patent Application No. 2007431.6 filed May 19, 2020, all of which are incorporated herein by reference in their entirety.

FIELD OF THE INVENTION

The present invention relates to a novel polypeptide which displays IgG cysteine protease activity, and in vivo and ex vivo uses thereof. Uses of the polypeptide include methods for the prevention or treatment of diseases and conditions mediated by IgG, and methods for the analysis of IgG and in vitro generation of F(ab')$_2$ fragments.

BACKGROUND OF THE INVENTION

IdeS (Immunoglobulin G-degrading enzyme of *S. pyogenes*, also known as imlifidase) is an extracellular cysteine protease produced by the human pathogen *S. pyogenes*. IdeS was originally isolated from a group A *Streptococcus* strain of serotype M1, but the ides gene has now been identified in all tested group A *Streptococcus* strains. IdeS has an extraordinarily high degree of substrate specificity, with its only identified substrate being IgG. IdeS catalyses a single proteolytic cleavage in the lower hinge region of the heavy chains of all subclasses of human IgG. IdeS also catalyses an equivalent cleavage of the heavy chains of some subclasses of IgG in various animals. IdeS efficiently cleaves IgG to Fc and F(ab')$_2$ fragments via a two-stage mechanism. In the first stage, one (first) heavy chain of IgG is cleaved to generate a single cleaved IgG (scIgG) molecule with a single non-covalently bound Fc chain. The scIgG molecule is effectively an intermediate product which retains the remaining (second) heavy chain of the original IgG molecule. In the second stage of the mechanism this second heavy chain is cleaved by IdeS to release a F(ab')$_2$ fragment and a homodimeric Fc fragment. These are the products generally observed under physiological conditions. The homodimeric Fc may dissociate into its component monomers. Under reducing conditions the F(ab')$_2$ fragment may dissociate to two Fab fragments. The IgG cleaving ability of IdeS has been shown to have utility ex vivo, for example in methods for production of Fab, F(ab')$_2$ and Fc fragments, which may be used e.g. for the analysis of IgG and in vitro generation of F(ab')$_2$ fragments. See, for example, WO2003051914 and WO2009033670. IdeS has also been shown to have in vivo utility as a therapeutic agent, since it is capable of the in vivo cleavage of IgG molecules which mediate disease or which are otherwise undesirable. See, for example, WO2006131347 and WO2013110946. IdeS may be used as a therapy for any disease or condition wholly or partly mediated by IgG. IgG contributes to the pathology of many autoimmune conditions as well as to acute rejection of transplanted organs.

However, IdeS is an immunogenic protein. That is, when IdeS is used as a therapeutic agent the immune system of the subject receiving IdeS will often respond to it. The reaction of the immune system to IdeS will typically involve the production of antibodies specific for IdeS. These antibodies may be referred to herein as anti-drug antibodies (ADA) specific for IdeS or "IdeS-specific ADA". The immune response to IdeS in general, and the production of IdeS-specific ADA in particular, may cause two related types of problem. Firstly, the efficacy of IdeS may be reduced, e.g. due to ADA binding, potentially requiring higher or repeat doses to achieve the same effect. ADA which have this effect may be referred to as "neutralising ADA". Secondly, there may be undesirable or even harmful complications, such as a hyper-inflammatory response triggered by immune complexes of ADA and IdeS. The higher the quantity of ADA specific for IdeS in a given subject, the greater the likelihood of these problems. The presence and quantity of IdeS-specific ADA molecules in a patient may be determined by any suitable method, such as an agent specific CAP FEIA (ImmunoCAP) test or a titre assay conducted on a serum sample from the patient. Above a threshold determined by the clinician, the quantity of IdeS-specific ADA molecules in the patient may preclude administration of IdeS, or indicate that a higher dose of IdeS is required. Such a higher dose may in turn result in an increased quantity of IdeS-specific ADA molecules in the patient, thereby precluding further administration of IdeS.

IdeS is a virulence factor of *S. pyogenes*, which is responsible for common infections like tonsillitis and strep throat. Accordingly, most human subjects have encountered IdeS in this context and are likely to have anti-IdeS antibodies in the bloodstream. Varying levels of IdeS-specific ADA can normally be detected in serum samples from human subjects (likely due to prior streptococcal infections), as well as in IVIg (Intravenous Immunoglobulin) preparations, which are preparations of IgG extracted from the pooled serum of thousands of donors. Techniques for detection of IdeS-specific ADA are known in the art. Even if a subject does not possess IdeS-specific ADA prior to an initial administration of IdeS, it is likely that such molecules will be produced subsequently. Thus, for any given subject, the problems associated with the immunogenicity of IdeS are likely to present a barrier to the use of IdeS as a treatment. These problems may require increases to the dose of IdeS and/or preclude treatment with IdeS entirely, particularly if repeat administrations are required. Existing approaches to problems of this type involve, for example, PEGylation of a therapeutic agent to reduce immunogenicity or co-administration of the therapeutic agent with an immune-suppressive agent.

IdeZ is an IgG cysteine protease produced by *Streptococcus equi* ssp. *zooepidemicus*, a bacterium predominantly found in horses. IdeZ has approximately 66% identity to IdeS. Since *Streptococcus equi* ssp. *zooepidemicus* is not a human pathogen, IdeZ was considered to be an alternative to IdeS-based therapies because humans may have fewer or no antibodies (anti-drug antibodies, ADA) against IdeZ. However, IdeZ has a level of IgG cysteine protease activity against human IgG which is considerably lower than that of IdeS, in particular when cleaving IgG2.

Thus, there remains a need for cysteine proteases derived from IdeZ having high activity (preferably higher than the wild type IdeZ and even more preferably higher than IdeS) against human IgG. In particular, there remains a need for cysteine proteases derived from IdeZ having high activity (preferably higher than the wild type IdeZ and even more preferably higher than IdeS) against human IgG1 and IgG2.

SUMMARY OF THE INVENTION

The full sequence of IdeS is publically available as NCBI Reference Sequence no. WP_010922160.1 and is provided herein as SEQ ID NO: 6. This sequence includes an N terminal methionine followed by a 28 amino acid secretion signal sequence. The N terminal methionine and the signal sequence (a total of 29 amino acids at the N terminus) are typically removed to form the mature IdeS protein, the sequence of which is publically available as Genbank accession no. ADF13949.1 and is provided herein as SEQ ID NO: 4.

The full sequence of IdeZ is publically available as NCBI Reference Sequence no WP_014622780.1 and is provided herein as SEQ ID NO: 5. This sequence includes an N terminal methionine followed by a 33 amino acid secretion signal sequence. The N terminal methionine and the signal sequence (a total of 34 amino acids at the N terminus) are typically removed to form the mature IdeZ protein, the sequence of which is provided herein as SEQ ID NO: 3.

The present inventors have been able to identify specific positions within the sequence of IdeZ which, when modified as described herein, lead to novel polypeptides which have increased IgG cysteine protease activity against human IgG relative to IdeZ. The IgG cysteine protease activity against human IgG (e.g. at cleaving human IgG) of a polypeptide of the invention is preferably at least as high as the IgG cysteine protease activity against human IgG of IdeS. A polypeptide of the invention may be more effective at cleaving human IgG than the IgG cysteine protease of IdeS, particularly when the IgG is an IgG1 or IgG2 isotype. A polypeptide of the invention may be more effective at cleaving human IgG than the IgG cysteine protease IdeS, particularly when measured with the cleavage of the second chain of IgG1. A polypeptide of the invention may be more effective at cleaving IgG1 than IgG2. The polypeptide of the invention is typically less immunogenic than IdeS and may preferably be no more immunogenic than IdeZ.

Unless otherwise stated, all references to numbering of amino acid positions in the polypeptides disclosed herein is based on the numbering of the corresponding positions in SEQ ID NO: 5, starting from the N terminus. Thus, since SEQ ID NO: 1 lacks the N terminal methionine and 33 amino acid signal sequence of SEQ ID NO: 5, the aspartic acid (D) residue at the N terminus of SEQ ID NO: 1 is referred to as position 35 as this is the corresponding position in SEQ ID NO: 5. Applying this numbering scheme, the most critical residue for IgG cysteine protease activity of IdeS is the cysteine (C) at position 102 corresponding to SEQ ID NO: 5. Other residues likely to be important for IgG cysteine protease activity are the lysine (K) at position 92, the histidine (H) at position 272, and the two aspartic acids (D) at positions 294 and 296 corresponding to SEQ ID NO: 5. It has also been found that deleting the first twenty residues at the N terminus of SEQ ID NO: 1 may enhance the potency of a polypeptide which incorporates this change and/or may reduce immunogenicity without adversely affecting potency. The first twenty residues at the N terminus of SEQ ID NO: 1 consists of the contiguous sequence DDYQRNATEAYAKEVPHQIT. Thus, a polypeptide according to the present invention may comprise the amino acid sequence of SEQ ID NO: 2 (which does not include the contiguous sequence DDYQRNATEAYAKEVPHQIT). The first twenty residues of SEQ ID NO: 1 correspond to positions 35-54 of SEQ ID NO: 5. This particular modification may be identified herein by the term "D35_T54del". Thus, since SEQ ID NO: 2 lacks the N terminal methionine, the 33 amino acid signal sequence of SEQ ID NO: 5, and further has a deletion of the sequence DDYQRNATEAY-AKEVPHQIT corresponding to positions 35-54 of SEQ ID NO: 5, the serine (S) residue at the N terminus of SEQ ID NO: 2 is referred to as position 55 as this is the corresponding position in SEQ ID NO: 5 Thus, in one aspect, the present invention provides a polypeptide having IgG cysteine protease activity and comprising or consisting of an amino acid sequence which is:
(i) SEQ ID NO: 1; or
(ii) SEQ ID NO: 2; or
(iii) a variant of SEQ ID NO: 1 or SEQ ID NO: 2, which has 1, 2, 3, 4, 5, 6, 7, 8, 9 or 10 amino acid modification(s) relative to SEQ ID NO: 1 or SEQ ID NO: 2 respectively, provided that the sequence retains: (a) an asparagine (N) at the position which corresponds to position 95 of SEQ ID NO: 5, (b) an aspartic acid (D) at the position which corresponds to position 99 of SEQ ID NO: 5 and (c) an asparagine (N) at the position which corresponds to position 226 of SEQ ID NO: 5, and provided that the polypeptide is at least as effective at cleaving human IgG as the polypeptide consisting of the amino acid sequence of SEQ ID NOs: 1 or 2 respectively, when measured in the same assay.

The invention also provides a polynucleotide, an expression vector or a host cell encoding or expressing a polypeptide of the invention.

The invention also provides a method of treating or preventing a disease or condition mediated by IgG antibodies in a subject, the method comprising administering to the subject a therapeutically or prophylactically effective amount of a polypeptide of the invention. The method may typically comprise multiple administrations of said polypeptide to the subject.

The invention also provides a method of treating, ex vivo, blood taken from a patient, typically a patient suffering from a disease or condition mediated by IgG antibodies, which method comprises contacting the blood with a polypeptide of the invention.

The invention also provides a method for improving the benefit to a subject of a therapy or therapeutic agent, the method comprising (a) administering to the subject a polypeptide of the invention; and (b) subsequently administering said therapy or said therapeutic agent to the subject; wherein:
said therapy is an organ transplant or said therapeutic agent is an antibody, a gene therapy such as a viral vector, a replacement for a defective endogenous factor such as an enzyme, a growth or a clotting factor, or a cell therapy;
the amount of said polypeptide administered is sufficient to cleave substantially all IgG molecules present in the plasma of the subject; and
steps (a) and (b) are separated by a time interval which is sufficient to cleave substantially all IgG molecules present in the plasma of the subject.

The invention also provides a method of generating Fc, Fab or F(ab')$_2$ fragments of IgG comprising contacting IgG with a polypeptide of the invention, preferably ex vivo.

Also provided are kits for carrying out the methods according to the invention.

BRIEF DESCRIPTION OF THE SEQUENCES

Figure 1:
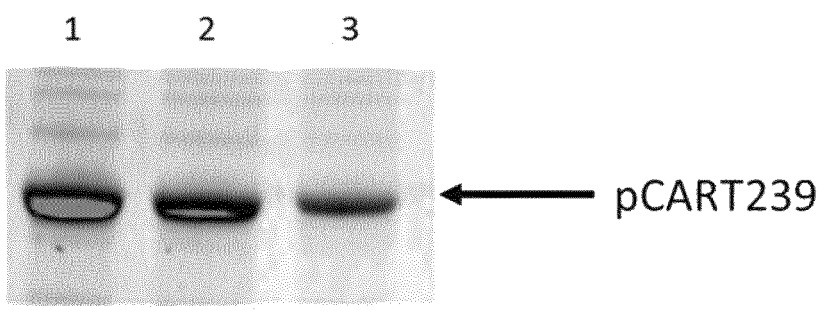
FIG. 1 shows SDS-PAGE analysis of the expression and purification of pCART239 (SEQ ID NO: 1 with N-terminal Met and C-terminal His tag). (A) Overexpression of pCART239—lanes 1 and 2 show lysates obtained from cells harvested 1 hour after induction with IPTG; lane 3 shows the pooled lysates. (B) Purification of pCART239—lane 1 shows the flow through from the NiNTA purification process, showing removal of impurities seen in the lysate, lanes 2 and 3 represent purified pCART239 (~0.5 μg and ~3.0 μg protein loaded respectively).
Figure 1:
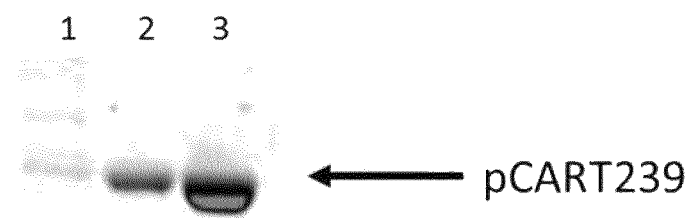

SEQ ID NO: 1 is the sequence of a polypeptide of the invention.
SEQ ID NO: 2 is the sequence of a further polypeptide of the invention, which is related to SEQ ID NO: 1 and is identical to SEQ ID NO: 1 apart from a deletion of the first 20 amino acids at the N-terminus of SEQ ID NO: 1 corresponding to the contiguous sequence DDYQRNATEAYAKEVPHQIT.
SEQ ID NO: 3 is the mature sequence of IdeZ, lacking the N terminal methionine and signal sequence.
SEQ ID NO: 4 is the mature sequence of IdeS, lacking the N terminal methionine and signal sequence. Also disclosed as Genbank accession no. ADF13949.1 SEQ ID NO: 5 is the full sequence of IdeZ including N terminal methionine and signal sequence. Also disclosed as NCBI Reference sequence no. WP_014622780.1.
SEQ ID NO: 6 is the full sequence of IdeS including N terminal methionine and signal sequence. Also disclosed as NCBI Reference sequence no. WP_010922160.1 SEQ ID NO: 7 is the sequence of pCART207, a variant IdeZ polypeptide.
SEQ ID NO: 8 is the sequence of pCART229, a variant IdeZ polypeptide.
SEQ ID NO: 9 is the sequence of pCART239, a variant IdeZ polypeptide of the invention, which is related to SEQ ID NO: 1 by the presence of an additional N-terminal methionine and an additional C-terminal histidine tag (with a glycine linker).
SEQ ID NO: 10 is the sequence of N240, a variant IdeZ polypeptide of the invention, which is related to SEQ ID NO: 1 by the presence of an additional N-terminal methionine.
SEQ ID NO: 11 is the sequence of pCART242, a variant IdeZ polypeptide of the invention, which is related to SEQ ID NO: 2 by the presence of an additional N-terminal methionine and an additional C-terminal histidine tag (with a glycine linker).
SEQ ID NO: 12 is the sequence of pCART243, an inactive variant IdeZ polypeptide.
SEQ ID NO: 13 is the sequence of a control IdeS polypeptide. Comprises the sequence of SEQ ID NO: 4 with an additional N terminal methionine and a histidine tag (with a glycine linker) (internal reference pCART124).
SEQ ID NO: 14 is the sequence of a control IdeZ polypeptide. Comprises the sequence of SEQ ID NO: 3 with an additional N terminal methionine and a histidine tag (with a glycine linker) (internal reference pCART144).
SEQ ID NO: 15 is the contiguous sequence DDYQRNATEAYAKEVPHQIT, which corresponds to positions 35-54 of SEQ ID NO: 5.
SEQ ID NOs: 16 to 23 are nucleotide sequences encoding certain polypeptides disclosed herein.

DETAILED DESCRIPTION OF THE INVENTION

It is to be understood that different applications of the disclosed products and methods may be tailored to the specific needs in the art. It is also to be understood that the terminology used herein is for the purpose of describing particular embodiments of the invention only, and is not intended to be limiting.

In addition as used in this specification and the appended claims, the singular forms "a", "an", and "the" include plural referents unless the content clearly dictates otherwise. Thus, for example, reference to "a polypeptide" includes "polypeptides", and the like.

A "polypeptide" is used herein in its broadest sense to refer to a compound of two or more subunit amino acids, amino acid analogs, or other peptidomimetics. The term "polypeptide" thus includes short peptide sequences and also longer polypeptides and proteins. As used herein, the term "amino acid" refers to either natural and/or unnatural or synthetic amino acids, including both D or L optical isomers, and amino acid analogs and peptidomimetics.

The terms "patient" and "subject" are used interchangeably and typically refer to a human. References to IgG typically refer to human IgG unless otherwise stated.

All publications, patents and patent applications cited herein, whether supra or infra, are hereby incorporated by reference in their entirety.

Functional Features of the Polypeptide

The present invention relates to a novel polypeptide having IgG cysteine protease activity, wherein said polypeptide is more effective at cleaving human IgG than IdeZ. The IgG cysteine protease activity against human IgG of a polypeptide of the invention is preferably at least as high as the IgG cysteine protease activity against human IgG of IdeS. In addition the polypeptide of the invention is typically less immunogenic than IdeS and may preferably be no more immunogenic than IdeZ. In the context of a control or a comparison relative to a polypeptide of the invention, "IdeS" and "IdeZ" refer to a polypeptide consisting of the amino acid sequence of SEQ ID NO: 4 and 3 respectively. Alternatively or in addition, "IdeS" and "IdeZ" when used as a control or a comparison may refer to a polypeptide comprising the amino acid sequence of SEQ ID NO: 4 and 3 respectively, with an additional methionine (M) residue at the N terminus and/or a tag at the C terminus to assist with expression in and isolation from standard bacterial expression systems. Suitable tags include a histidine tag which may be joined directly to the C terminus of a polypeptide or joined indirectly by any suitable linker sequence, such as 3, 4 or 5 glycine residues. The histidine tag typically consists of six histidine residues, although it can be longer than this, typically up to 7, 8, 9, 10 or 20 amino acids or shorter, for example 5, 4, 3, 2 or 1 amino acids. The sequence of an exemplary IdeS polypeptide used herein as a control is provided as SEQ ID NO: 13. This polypeptide comprises the sequence of SEQ ID NO: 4 with an additional N terminal methionine and a histidine tag and may be referred to herein as pCART124. The sequence of an exemplary IdeZ polypeptide used herein as a control is provided as SEQ ID NO: 14. This polypeptide comprises the sequence of SEQ ID NO: 3 with an additional N terminal methionine and a histidine tag and may be referred to herein as pCART144.

IgG cysteine protease activity may be assessed by any suitable method, for example by incubating a polypeptide with a sample containing IgG and determining the presence of IgG cleavage products. Efficacy may be assessed in the presence or absence of an inhibitor, such as a neutralising antibody. However, efficacy herein will typically mean efficacy as assessed in the absence of such an inhibitor unless otherwise stated. Suitable methods are described in the Examples. The efficacy of a polypeptide at cleavage of IgG may be referred to herein as the "potency" of the polypeptide. The potency of a polypeptide of the invention is preferably at least 2.0 fold greater than the potency of IdeZ measured in the same assay. The potency of a polypeptide of the invention may be at least 1.5 fold, 2.0 fold, 2.5 fold, 3.0 fold, 4.0 fold, 4.5 fold, 5.0 fold, 6.0 fold, 7.0 fold, 7.5 fold or 8.0 fold greater than the potency of IdeZ measured in the same assay. Alternatively or in addition, the potency of a polypeptide of the invention is preferably at least equivalent to the potency of IdeS measured in the same assay. Alternatively or in addition, the potency of a polypeptide of the invention is preferably greater than the potency of IdeS measured in the same assay. The potency of a polypeptide of the invention may be at least 1.1 fold, 1.2 fold, 1.3 fold, 1.4 fold, 1.5 fold, 1.6 fold, 1.7 fold, 1.8 fold, 1.9 fold, 2.0 fold, 2.5 fold, 3.0 fold, 4.0 fold greater than the potency of IdeS measured in the same assay. The potency of a polypeptide of the invention is preferably at least 2.0 fold, more preferably at least 3.0 or at least 4.0 fold greater than the potency of IdeS measured in the same assay.

The polypeptide of the invention is typically less immunogenic than IdeS and so increased potency relative to that of IdeZ and/or potency equivalent to that of IdeS is an acceptable minimum standard for cysteine protease activity against human IgG. However, increased potency relative to IdeS is a desirable improvement. Such increased potency will typically enable the use of a lower dose of a polypeptide of the invention for the same therapeutic effect as a higher dose of IdeS. The lower dose may also permit a greater number of repeat administrations of a polypeptide of the invention relative to IdeS. This is because the use of a lower dose reduces the problems associated with immunogenicity of a therapeutic agent, because the immune system is less likely to respond, or will respond less vigorously, to an agent which is present at a lower concentration.

Assays for assessing the efficacy of a polypeptide at the cleavage of IgG, that is assays for assessing the potency of a polypeptide, are well known in the art and any suitable assay may be used. Suitable assays include an ELISA-based assay, such as that which is described in the Examples. In such an assay, the wells of an assay plate will typically be coated with an antibody target, such as bovine serum albumin (BSA). Samples of the polypeptide to be tested are then added to the wells, followed by samples of target-specific antibody that is antibody specific for BSA in this example (and which is sensitive to cleavage by IdeS). The polypeptide and antibody are allowed to interact under conditions suitable for IgG cysteine protease activity. After a suitable interval, the assay plate will be washed and a detector antibody which specifically binds to the Fc-region of the target-specific antibody will be added under conditions suitable for binding to the target-specific antibody. The detector antibody will bind to the Fc-region of any intact target-specific antibody that has bound to the target in each well. After washing, the amount of detector antibody present in a well will be proportional to the amount of target-specific antibody bound to that well. The detector antibody may be conjugated directly or indirectly to a label or another reporter system (such as an enzyme), such that the amount of detector antibody remaining in each well can be determined. The higher the potency of the tested polypeptide that was in a well, the less intact target-specific antibody will remain and thus there will be less detector antibody. Typically, at least one well on a given assay plate will include IdeS instead of a polypeptide to be tested, so that the potency of the tested polypeptides may be directly compared to the potency of IdeS. IdeZ or a known variant of IdeZ may also be included for comparison.

Figure 9:
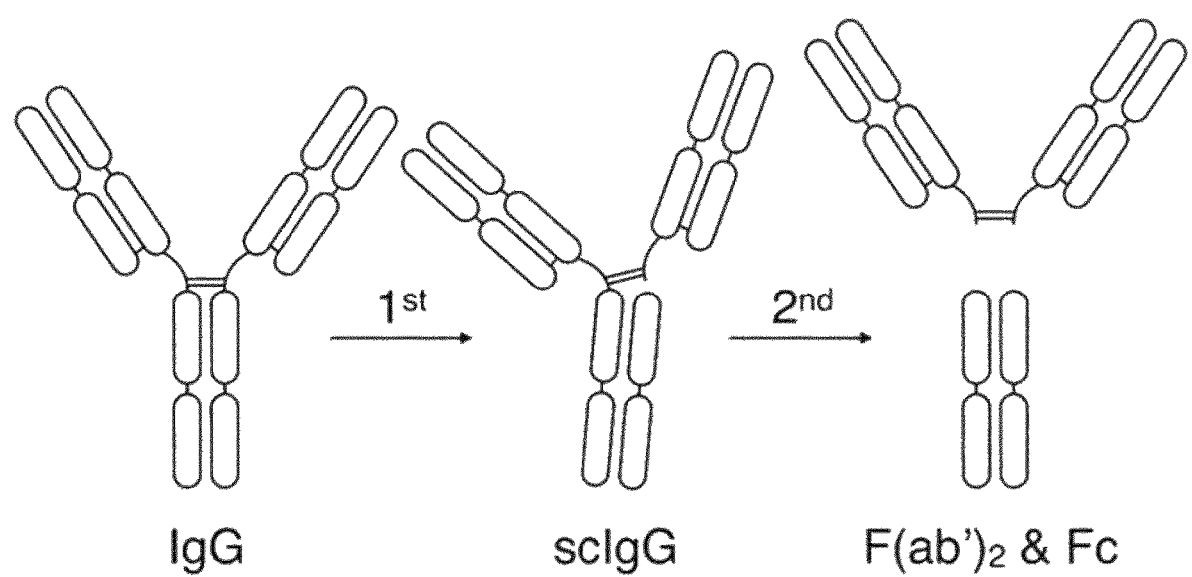
FIG. 9 shows a schematic representation of the stepwise cleavage of IgG by polypeptides of the invention.

Other assays may determine the potency of a tested polypeptide by directly visualizing and/or quantifying the fragments of IgG which result from cleavage of IgG by a tested polypeptide. An assay of this type is also described in the Examples. Such an assay will typically incubate a sample of IgG with a test polypeptide (or with one or more of IdeS, IdeZ and a known variant of IdeZ as a control) at differing concentrations in a titration series. The products which result from incubation at each concentration are then separated using gel electrophoresis, for example by SDS-PAGE. Whole IgG and the fragments which result from cleavage of IgG can then be identified by size and quantified by the intensity of staining with a suitable dye. The greater the quantity of cleavage fragments, the greater the potency of a tested polypeptide at a given concentration. A polypeptide of the invention will typically produce detectable quantities of cleavage fragments at a lower concentration (a lower point in the titration series) than IdeZ and/or IdeS. This type of assay may also enable the identification of test polypeptides that are more effective at cleaving the first or the second heavy chain of an IgG molecule, as the quantities of the different fragments resulting from each cleavage event may also be determined. Samples of IgG suitable for potency assays as described herein may be from various sources. For example, commercial antibody preparations may be used. Commercial antibody preparations are generally pure and isotype and subclass specific. Alternatively, a sample comprising mixed populations of IgG, such as human serum, may be used. Samples of IgG comprising serum may comprise ADA against IdeS and/or IdeZ. As such, samples of IgG suitable for potency assays as described herein may comprise ADA. A polypeptide of the invention may be more effective (when compared to IdeS and/or IdeZ) at cleaving the first chain of an IgG molecule than the second chain (see schematic representation in FIG. 9), particularly when the IgG is an IgG2 isotype. Alternatively, a polypeptide of the invention may be more effective (when compared to IdeS and/or IdeZ) at cleaving the second chain of an IgG molecule than the second chain (see schematic representation in FIG. 9), particularly when the IgG is an IgG1 isotype. A polypeptide of the invention may be more effective (when compared to IdeS and/or IdeZ) at cleaving IgG1 than IgG2.

This type of assay may also be adapted to determine the extent to which the presence of IdeS-specific ADA may reduce the potency of a polypeptide of the invention. In the adapted assay, when a sample of IgG is incubated with a test polypeptide (or with IdeS as a control), serum or an IVIg preparation containing IdeS-specific ADA is included with the reaction medium. Preferably, the potency of a polypeptide of the invention is not affected by the presence of ADA or is less reduced by the presence of ADA than the potency of IdeS in the same assay. In other words, preferably the neutralizing effect of IdeS-specific ADA on the polypeptide of the invention is the same or lower than the neutralizing effect of IdeS-specific ADA on IdeS, measured in the same assay.

As indicated above, a polypeptide of the invention is typically less immunogenic than IdeS. That is, a polypeptide of the invention may result in the same or preferably a lower immune response than IdeS when present at an equivalent dose or concentration and measured in the same assay. The immunogenicity of a polypeptide of the invention is typically no more than 50%, no more than 45%, no more than 40%, no more than 35%, no more than 30%, or no more than 25% of the immunogenicity of IdeS measured in the same assay. Preferably the immunogenicity of a polypeptide of the invention is no more than 25% of the immunogenicity of IdeS measured in the same assay.

Assays for assessing the immunogenicity of a polypeptide are also well known in the art and any suitable assay may be used. Preferred assays for assessing the immunogenicity of a polypeptide relative to the immunogenicity of IdeS involves assessing the extent to which ADA specific for IdeS also bind to a polypeptide of the invention. Assays of this type are described in the Examples. The presence and quantity of IdeS-specific ADA molecules in a patient may be determined by any suitable method, such as an agent specific CAP FEIA (ImmunoCAP) test or a titre assay conducted on a serum sample from the patient.

One such assay involves testing for competition between IdeS and a test polypeptide for binding to IdeS-specific ADA. Typically, the wells of an assay plate are coated with IdeS, followed by administration of a pre-incubated mixture of a solution containing IdeS-specific ADA, e.g. an IVIg preparation, and a test polypeptide (or IdeS as a control). The pre-incubation takes place in the presence of an inhibitor of IgG cysteine protease activity, e.g. iodoacetic acid (IHAc), and at high salt concentration so that only high affinity binding between protein and ADA is permitted. The pre-incubated mixture is allowed to interact with the IdeS coated wells. Any IdeS-specific ADA not bound to test polypeptide will bind to the IdeS on the wells. After a suitable interval, the assay plate will be washed and a detector antibody which specifically binds to IgG will be added under conditions suitable for binding. The detector antibody will bind to any ADA that has bound to the IdeS in each well. After washing, the amount of detector antibody present in a well will be inversely proportional to the amount of ADA that had bound to the test polypeptide. The detector antibody may be conjugated directly or indirectly to a label or another reporter system (such as an enzyme), such that the amount of detector antibody remaining in each well can be determined. Typically, at least one well on a given assay plate will be tested with a pre-incubated mixture of IVIg and IdeS instead of a polypeptide to be tested, so that the binding of ADA to the tested polypeptides may be directly compared to the binding to IdeS. IdeZ may also be included as further controls.

Another suitable assay involves testing the extent to which a titration series of different concentrations of IdeS-specific ADA, e.g. an IVIg preparation, binds to a test polypeptide as compared to IdeS and/or IdeZ as control. Preferably, a polypeptide of the invention will require a higher concentration of ADA for binding to be detectable, relative to the concentration of ADA for which binding to IdeS is detectable. Such an assay is described in the Examples. Such an assay typically involves coating the wells of an assay plate with test polypeptide or control, followed by incubating each well with a different concentration of IdeS-specific ADA from a titration series. The incubations are conducted in the presence of an inhibitor of IgG cysteine protease activity, e.g. iodoacetic acid (IHAc), and at high salt concentration so that only high affinity binding between protein and ADA is permitted. After a suitable interval, the assay plate will be washed and a detector antibody which specifically binds to IgG F(ab')$_2$ will be added under conditions suitable for binding. The detector antibody will bind to any ADA that has bound to the test polypeptide or the IdeS coated in each well. After washing, the amount of detector antibody present in a well will be directly proportional to the amount of ADA that had bound to the test polypeptide or control. The detector antibody may be conjugated directly or indirectly to a label or another reporter system (such as an enzyme), such that the amount of detector antibody remaining in each well can be determined. At least one well on a given assay plate will be incubated with buffer lacking ADA as a blank to establish a threshold level for detection of binding in the test wells.

Structural Features of the Polypeptide

This section sets out the structural features of a polypeptide of the invention, which apply in addition to the functional features outlined in the preceding section.

The polypeptide of the invention is typically at least 100, 150, 200, 250, 260, 270, 280, 290, 300 or 310 amino acids in length. The polypeptide of the invention is typically no larger than 400, 350, 340, 330, 320 or 315 amino acids in length. It will be appreciated that any of the above listed lower limits may be combined with any of the above listed upper limits to provide a range for the length the polypeptide of the invention. For example, the polypeptide may be 100 to 400 amino acids in length, or 250 to 350 amino acids in length. The polypeptide is preferably 290 to 320 amino acids in length, most preferably 300 to 315 amino acids in length.

The primary structure (amino acid sequence) of a polypeptide of the invention is SEQ ID NO: 1, which is a specific variant based on the wild type mature IdeZ sequence (SEQ ID NO: 3). In other words, SEQ ID NO: 1 is related to SEQ ID NO: 3 through a specific set of point mutations in the primary polypeptide sequence (when compared to SEQ ID NO: 3) which are responsible for its increased potency against human IgG.

Another polypeptide of the invention is SEQ ID NO: 2, which is related to SEQ ID NO: 1. SEQ ID NO: 2 is identical to SEQ ID NO: 1 apart from a deletion of the first 20 amino acids at the N-terminus of SEQ ID NO: 1 corresponding to the contiguous sequence DDYQRNATEAYAKEVPHQIT. In other words, SEQ ID NO: 2 is also identical to SEQ ID NO: 1 with respect to the point mutations in the primary polypeptide sequence with respect to the wild type IdeZ sequence (SEQ ID NO: 3).

The present invention also relates to a variant of SEQ ID NO: 1 or SEQ ID NO: 2, which has 1, 2, 3, 4, 5, 6, 7, 8, 9 or 10 amino acid modification(s) relative to SEQ ID NO: 1 or SEQ ID NO: 2 respectively, provided that the sequence retains: (a) an asparagine (N) at the position which corresponds to position 95 of SEQ ID NO: 5, (b) an aspartic acid (D) at the position which corresponds to position 99 of SEQ ID NO: 5 and (c) an asparagine (N) at the position which corresponds to position 226 of SEQ ID NO: 5, and provided that the polypeptide is at least as effective at cleaving human IgG as the polypeptide consisting of the amino acid sequence of SEQ ID NOs: 1 or 2 respectively, when measured in the same assay. Optionally, the one or more amino acid modifications in the variant of SEQ ID NO: 1 or SEQ ID NO: 2 does not result in the same amino acid as is present in the corresponding position in the polypeptide sequence of SEQ ID NO: 3, preferably wherein all of the modifications do not result in the same amino acid as is present in the corresponding position in the polypeptide sequence of SEQ ID NO: 3.

Where the sequence of a polypeptide of the invention comprises a variant of the amino acid sequence of SEQ ID NO: 1 or SEQ ID NO: 2 in which 1, 2, 3, 4, 5, 6, 7, 8, 9 or 10 amino acid modifications, such as amino acid additions, deletions or substitutions are made relative to the sequence of SEQ ID NO: 1 or SEQ ID NO: 2 the sequence must retain: (a) an asparagine (N) at the position which corresponds to position 95 of SEQ ID NO: 5, (b) an aspartic acid (D) at the position which corresponds to position 99 of SEQ ID NO: 5 and (c) an asparagine (N) at the position which corresponds to position 226 of SEQ ID NO: 5. Otherwise, the modifications are preferably conservative amino acid substitutions. Variants of the amino acid sequence of SEQ ID NO: 1 or SEQ ID NO: 2 may comprise one or more modifications (made relative to SEQ ID NO: 1 or SEQ ID NO: 2 respectively) which does not result in the same amino acid as is present in the corresponding position in the polypeptide sequence of SEQ ID NO: 3. Preferably, in variants of the amino acid sequence of SEQ ID NO: 1 or SEQ ID NO: 2, all of the modifications (made relative to SEQ ID NO: 1 or SEQ ID NO: 2 respectively) do not result in the same amino acid as is present in the corresponding position in the polypeptide sequence of SEQ ID NO: 3.

Conservative substitutions replace amino acids with other amino acids of similar chemical structure, similar chemical properties and/or similar side-chain volume. The amino acids introduced may have similar polarity, hydrophilicity, hydrophobicity, basicity, acidity, neutrality or charge to the amino acids they replace. Alternatively, the conservative substitution may introduce another amino acid that is aromatic or aliphatic in the place of a pre-existing aromatic or aliphatic amino acid. Conservative amino acid changes are well-known in the art and may be selected in accordance with the properties of the 20 main amino acids as defined in Table A1 below. Where amino acids have similar polarity, this can be determined by reference to the hydropathy scale for amino acid side chains in Table A2.

TABLE A1

Chemical properties of amino acids

| Ala (A) | aliphatic, hydrophobic, neutral |
| Cys (C) | polar, hydrophobic, neutral |
| Asp (D) | polar, hydrophilic, charged (−) |
| Glu (E) | polar, hydrophilic, charged (−) |
| Phe (F) | aromatic, hydrophobic, neutral |
| Gly (G) | aliphatic, neutral |
| His (H) | aromatic, polar, hydrophilic, charged (+) |
| Ile (I) | aliphatic, hydrophobic, neutral |
| Lys (K) | polar, hydrophilic, charged (+) |
| Leu (L) | aliphatic, hydrophobic, neutral |
| Met (M) | hydrophobic, neutral |
| Asn (N) | polar, hydrophilic, neutral |
| Pro (P) | hydrophobic, neutral |
| Gln (Q) | polar, hydrophilic, neutral |
| Arg (R) | polar, hydrophilic, charged (+) |
| Ser (S) | polar, hydrophilic, neutral |
| Thr (T) | polar, hydrophilic, neutral |
| Val (V) | aliphatic, hydrophobic, neutral |
| Trp (W) | aromatic, hydrophobic, neutral |
| Tyr (Y) | aromatic, polar, hydrophobic |

TABLE A2

Hydropathy scale

| Side Chain | Hydropathy |
| --- | --- |
| Ile | 4.5 |
| Val | 4.2 |
| Leu | 3.8 |
| Phe | 2.8 |
| Cys | 2.5 |
| Met | 1.9 |
| Ala | 1.8 |
| Gly | −0.4 |
| Thr | −0.7 |
| Ser | −0.8 |
| Trp | −0.9 |
| Tyr | −1.3 |
| Pro | −1.6 |
| His | −3.2 |
| Glu | −3.5 |
| Gln | −3.5 |
| Asp | −3.5 |
| Asn | −3.5 |
| Lys | −3.9 |
| Arg | −4.5 |

Certain residues (other than positions 95, 99 and 226 corresponding to SEQ ID NO: 5) in the amino acid sequence of SEQ ID NO: 1 or SEQ ID NO: 2 are preferably retained within a variant sequence comprising 1, 2, 3, 4, 5, 6, 7, 8, 9 or 10 amino acid modifications. For example, the said variant sequence typically retains certain residues which are known to be required for IgG cysteine protease activity. Thus, the cysteine corresponding to position 102 of SEQ ID NO: 5 must be retained in the amino acid sequence of a polypeptide of the invention. Optionally, the lysine (K) corresponding to position 92 of SEQ ID NO: 5, the histidine (H) corresponding to position 272 of SEQ ID NO: 5, and the aspartic acid (D) corresponding to each of positions 294 and 296 of SEQ ID NO: 5 are also retained. Thus, a polypeptide variant of SEQ ID NO: 1 or SEQ ID NO: 2 according to the present invention typically has a cysteine (C) at the position in which corresponds to position 102 of SEQ ID NO: 5; and optionally has, at the positions which correspond to positions 92, 272, 294 and 296 of SEQ ID NO: 5, a lysine (K), a histidine (H), an aspartic acid (D) and an aspartic acid (D), respectively.

The inventors have also determined that certain other modifications to the sequence of SEQ ID NO: 1 or SEQ ID NO: 2 may increase the potency of a polypeptide of the invention and/or may reduce the recognition of a polypeptide of the invention by IdeS-specific ADA. Thus, a polypeptide variant of SEQ ID NO: 1 or SEQ ID NO: 2 according to the present invention may comprise an amino acid substitution made at 1, 2, 3, 4, 5, 6, 7, 8, 9 or 10 of the positions corresponding to positions 84, 93, 97, 137, 139, 140, 147, 150, 162, 165, 166, 171, 174, 205, 226, 237, 239, 243, 250, 251, 254, 255, 282, 288, 312, 315, 347, 349 of SEQ ID NO: 5.

The substitutions typically replace the existing amino acid with another amino acid that has different properties. For example, an uncharged amino acid may be replaced with a charged amino acid, and vice versa. Preferred substitutions at these positions are set out in Table B below using the one letter code:

TABLE B

| Existing amino acid in SEQ ID NO: 1 or 2 | Position corresponding to SEQ ID NO: 5 | Preferred replacement |
|---|---|---|
| H | 84 | N |
| A | 93 | T |
| K | 97 | A |
| F | 137 | I |
| N | 139 | R/K |
| Q | 140 | E |
| A | 147 | E |
| D | 150 | R |
| N | 162 | E |
| R | 165 | K |
| D | 166 | E |
| N | 171 | Y |
| A | 174 | T |
| N | 205 | K |
| L | 237 | F |
| N | 239 | E |
| N | 243 | K |
| K | 250 | S |
| Q | 251 | E |
| T | 254 | E |

TABLE B-continued

| Existing amino acid in SEQ ID NO: 1 or 2 | Position corresponding to SEQ ID NO: 5 | Preferred replacement |
|---|---|---|
| E | 255 | K |
| N | 282 | D |
| E | 288 | K |
| A | 312 | K |
| H | 315 | K |
| K | 347 | Q |
| S | 349 | N |

Each of the substitutions may be referred to herein using a term obtained by combining the entries in the first, second and third columns for each row from left to right. For example, the substitution in the first row of table B may be referred to herein as "H84N", the substitution in the second row may be referred to as "A93T", and so on. 7.

Table C below summarize changes made relative to the wild type IdeZ sequence (SEQ ID NO: 3) to produce the amino acid sequences of certain polypeptides described herein.

TABLE C

| Internal reference | Modifications relative to IdeZ (SEQ ID NO: 3) (positions correspond to SEQ ID NO: 5) | SEQ ID NO of full sequence |
|---|---|---|
| pCART207 | L64_T65del, R70T, Y71del, N72Q, N73G, N138R | 7 |
| pCART229 | L64_T65del, R70T, Y71del, N72Q, N73G, N138R, D226N | 8 |
| pCART239/ N240 | L64_T65del, R70T, Y71del, N72Q, N73G, D95N, N99D, N138R, D226N | 9 (pCART239); 10 (N240) |
| pCART242 | D35_TS4del, L64_T65del, R70T, Y71del, N72Q, N73G, D95N, N99D, N138R, D226N | 11 |

The amino acid sequences of certain polypeptides referred to herein are reproduced in full below.

SEQ ID NO: 1

DDYQRNATEAYAKEVPHQITSVWTKGVTPPEQFTQGEDVIHAPYLAHQGWYDITKAFNGKDDLLCGAATAGNMLH

WWFDQNKTEIEAYLSKHPEKQKIIFRNQELFDLKAAIDTKDSQTNSQLFNYERDKAFPNLSARQLGVMPDLVLDM

FINGYYLNVFKTQSTDVNRPYQDKDKRGGIFDAVFTRGNQTTLLTARHDLKNKGLNDISTIIKQELTEGRALALS

HTYANVSISHVINLWGADFNAEGNLEAIYVTDSDANASIGMKKYFVGINAHGHVAISAKKIEGENIGAQVLGLFT

LSSGKDIWQKLS

SEQ ID NO: 2

SVWTKGVTPPEQFTQGEDVIHAPYLAHQGWYDITKAFNGKDDLLCGAATAGNMLHWWFDQNKTEIEAYLSKHPEK

QKIIFRNQELFDLKAAIDTKDSQTNSQLFNYFRDKAFPNLSARQLGVMPDLVLDMFINGYYLNVFKTQSTDVNRP

YQDKDKRGGIFDAVFTRGNQTTLLTARHDLKNKGLNDISTIIKQELTEGRALALSHTYANVSISHVINLWGADFN

AEGNLEAIYVTDSDANASIGMKKYFVGINAHGHVAISAKKIEGENIGAQVLGLFTLSSGKDIWQKLS (IdeZ mature sequence)

SEQ ID NO: 3

DDYQRNATEAYAKEVPHQITSVWTKGVTPLTPEQFRYNNEDVIHAPYLAHQGWYDITKAFDGKDNLLCGAATAGN

MLHWWFDQNKTEIEAYLSKHPEKQKIIFNNQELFDLKAAIDTKDSQTNSQLFNYFRDKAFPNLSARQLGVMPDLV

-continued

LDMFINGYYLNVFKTQSTDVNRPYQDKDKRGGIFDAVFTRGDQTTLLTARHDLKNKGLNDISTIIKQELTEGRAL

ALSHTYANVSISHVINLWGADFNAEGNLEAIYVTDSDANASIGMKKYFVGINAHGHVAISAKKIEGENIGAQVLG

LFTLSSGKDIWQKLS (IdeS mature sequence)
SEQ ID NO: 4

DSFSANQEIRYSEVTPYHVTSVWTKGVTPPANFTQGEDVFHAPYVANQGWYDITKTFNGKDDLLCGAATA

GNMLHWWFDQNKDQIKRYLEEHPEKQKINFNGEQMFDVKEAIDTKNHQLDSKLFEYFKEKAFPYLSTKHL

GVFPDHVIDMFINGYRLSLTNHGPTPVKEGSKDPRGGIFDAVFTRGDQSKLLTSRHDFKEKNLKEISDLI

KKELTEGKALGLSHTYANVRINHVINLWGADFDSNGNLKAIYVTDSDSNASIGMKKYFVGVNSAGKVAIS

AKEIKEDNIGAQVLGLFTLSTGQDSWNQTN (IdeZ full sequence)
SEQ ID NO: 5

MKTIAYPNKPHSLSAGLLTAIAIFSLASSNITYADDYQRNATEAYAKEVPHQITSVWTKGVTPLTPEQFRYNNED

VIHAPYLAHQGWYDITKAFDGKDNLLCGAATAGNMLHWWFDQNKTEIEAYLSKHPEKQKIIFNNQELFDLKAAID

TKDSQTNSQLFNYFRDKAFPNLSARQLGVMPDLVLDMFINGYYLNVFKTQSTDVNRPYQDKDKRGGIFDAVFTRG

DQTTLLTARHDLKNKGLNDISTIIKQELTEGRALALSATYANVSISHVINLWGADFNAEGNLEAIYVIDSDANAS

IGMKKYFVGINAHGHVAISAKKIEGENIGAQVLGLFTLSSGKDIWQKLS (IdeS full sequence)
SEQ ID NO: 6

MRKRCYSTSAAVLAAVTLFVLSVDRGVIADSFSANQEIRYSEVTPYHVTSVWTKGVTPPANFTQGEDVFHAPYVA

NQGWYDITKTFNGKDDLLCGAATAGNMLHWWFDQNKDQIKRYLEEHPEKQKINFNGEQMFDVKEAIDTKNHQLDS

KLFEYFKEKAFPYLSTKHLGVFPDHVIDMFINGYRLSLTNHGPTPVKEGSKDPRGGIFDAVFTRGDQSKLLTSRH

DFKEKNLKEISDLIKKELTEGKALGLSHTYANVRINHVINLWGADFDSNGNLKAIYVTDSDSNASIGMKKYFVGV

NSAGKVAISAKEIKEDNIGAQVLGLFTLSTGQDSWNQTN (pCART207)
SEQ ID NO: 7

MDDYQRNATEAYAKEVPHQITSVWTKGVTPPEQFTQGEDVIHAPYLAHQGWYDITKAFDGKDNLLCGAATAGNML

HWWFDQNKTEIEAYLSKHPEKQKIIFRNQELFDLKAAIDTKDSQTNSQLFNYFRDKAFPNLSARQLGVMPDLVLD

MFINGYYLNVFKTQSTDVNRPYQDKDKRGGIFDAVFTRGDQTTLLTARHDLKNKGLNDISTIIKQELTEGRALAL

SHTYANVSISHVINLWGADFNAEGNLEAIYVTDSDANASIGMKKYFVGINAHGHVAISAKKIEGENIGAQVLGLF

TLSSGKDIWQKLS (pCART229)
SEQ ID NO: 8

MDDYQRNATEAYAKEVPHQITSVWTKGVTPPEQFTQGEDVIHAPYLAHQGWYDITKAFDGKDNLLCGAATAGNML

HWWFDQNKTEIEAYLSKHPEKQKIIFRNQELFDLKAAIDTKDSQTNSQLFNYFRDKAFPNLSARQLGVMPDLVLD

MFINGYYLNVFKTQSTDVNRPYQDKDKRGGIFDAVFTRGNQTTLLTARHDLKNKGLNDISTIIKQELTEGRALAL

SHTYANVSISHVINLWGADFNAEGNLEAIYVTDSDANASIGMKKYFVGINAHGHVAISAKKIEGENIGAQVLGLF

TLSSGKDIWQKLS (pCART239)
SEQ ID NO: 9

MDDYQRNATEAYAKEVPHQITSVWTKGVTPPEQFTQGEDVIHAPYLAHQGWYDITKAFNGKDDLLCGAATAGNML

HWWFDQNKTEIEAYLSKHPEKQKIIFRNQELFDLKAAIDTKDSQTNSQLFNYFRDKAFPNLSARQLGVMPDLVLD

MFINGYYLNVFKTQSTDVNRPYQDKDKRGGIFDAVFTRGNQTTLLTARHDLKNKGLNDISTIIKQELTEGRALAL

SHTYANVSISHVINLWGADFNAEGNLEAIYVTDSDANASIGMKKYFVGINAHGHVAISAKKIEGENIGAQVLGLF

TLSSGKDIWQKLSGGGHHHHHH

-continued (N240)

SEQ ID NO: 10

MDDYQRNATEAYAKEVPHQITSVWTKGVTPPEQFTQGEDVIHAPYLAHQGWYDITKAFNGKDDLLCGAATAGNML

HWWFDQNKTEIEAYLSKHPEKQKIIFRNQELFDLKAAIDTKDSQTNSQLFNYFRDKAFPNLSARQLGVMPDLVLD

MFINGYYLNVFKTQSTDVNRPYQDKDKRGGIFDAVFTRGNQTTLLTARHDLKNKGLNDISTIIKQELTEGRALAL

SHTYANVSISHVINLWGADFNAEGNLEAIYVTDSDANASIGMKKYFVGINAHGHVAISAKKIEGENIGAQVLGLF

TLSSGKDIWQKLS (pCART242)

SEQ ID NO: 11

MSVWTKGVTPPEQFTQGEDVIHAPYLAHQGWYDITKAFNGKDDLLCGAATAGNMLHWWFDQNKTEIEAYLSKHPE

KQKIIFRNQELFDLKAAIDTKDSQTNSQLFNYFRDKAFPNLSARQLGVMPDLVLDMFINGYYLNVFKTQSIDVNR

PYQDKDKRGGIFDAVFTRGNQTTLLTARHDLKNKGLNDISTIIKQELTEGRALALSHTYANVSISHVINLWGADF

NAEGNLEAIYVTDSDANASIGMKKYFVGINAHGHVAISAKKIEGENIGAQVLGLFTLSSGKDIWQKLSGGGHHHH

HH (pCART243-inactive IdeZ variant)

SEQ ID NO: 12

MDDYQRNATEAYAKEVPHQITSVWTKGVTPPEQFTQGEDVIHAPYLAHQGWYDITKAFNGKDDLLGGAATAGNML

HWWFDQNKTEIEAYLSKHPEKQKIIFRNQELFDLKAAIDTKDSQTNSQLFNYFRDKAFPNLSARQLGVMPDLVLD

MFINGYYLNVFKTQSTDVNRPYQDKDKRGGIFDAVFTRGNQTTLLTARHDLKNKGLNDISTIIKQELTEGRALAL

SHTYANVSISHVINLWGADFNAEGNLEAIYVTDSDANASIGMKKYFVGINAHGHVAISAKKIEGENIGAQVLGLF

TLSSGKDIWQKLSGGGHHHHHH

The polypeptide of the invention may comprise, consist essentially, or consist of the sequence of SEQ ID NO: 1 or SEQ ID NO: 2. Each of SEQ ID NO: 1 or SEQ ID NO: 2 may optionally include an additional methionine at the N terminus and/or a histidine tag at the C terminus. The histidine tag is preferably consisting of six histidine residues. The histidine tag is preferably linked to the C terminus by a linker of 3× glycine or 5× glycine residues.

Where relevant, amino acid identity may be calculated using any suitable algorithm. For example the PILEUP and BLAST algorithms can be used to calculate identity or line up sequences (such as identifying equivalent or corresponding sequences (typically on their default settings), for example as described in Altschul S. F. (1993) J Mol Evol 36:290-300; Altschul, S, F et al (1990) J Mol Biol 215:403-10. Software for performing BLAST analyses is publicly available through the National Center for Biotechnology Information (http://www.ncbi.nlm.nih.gov/) This algorithm involves first identifying high scoring sequence pair (HSPs) by identifying short words of length W in the query sequence that either match or satisfy some positive-valued threshold score T when aligned with a word of the same length in a database sequence. T is referred to as the neighbourhood word score threshold (Altschul et al, supra). These initial neighbourhood word hits act as seeds for initiating searches to find HSPs containing them. The word hits are extended in both directions along each sequence for as far as the cumulative alignment score can be increased. Extensions for the word hits in each direction are halted when: the cumulative alignment score falls off by the quantity X from its maximum achieved value; the cumulative score goes to zero or below, due to the accumulation of one or more negative-scoring residue alignments; or the end of either sequence is reached. The BLAST algorithm parameters W, T and X determine the sensitivity and speed of the alignment. The BLAST program uses as defaults a word length (W) of 11, the BLOSUM62 scoring matrix (see Henikoff and Henikoff (1992) Proc. Natl. Acad. Sci. USA 89: 10915-10919) alignments (B) of 50, expectation (E) of 10. M=5, N=4, and a comparison of both strands.

The BLAST algorithm performs a statistical analysis of the similarity between two sequences; see e.g., Karlin and Altschul (1993) Proc. Nal. Acad. Sci. USA 90: 5873-5787. One measure of similarity provided by the BLAST algorithm is the smallest sum probability (P(N)), which provides an indication of the probability by which a match between two polynucleotide or amino acid sequences would occur by chance. For example, a sequence is considered similar to another sequence if the smallest sum probability in comparison of the first sequence to the second sequence is less than about 1, preferably less than about 0.1, more preferably less than about 0.01, and most preferably less than about 0.001. Alternatively, the UWGCG Package provides the BESTFIT program which can be used to calculate identity (for example used on its default settings) (Devereux et al (1984) Nucleic Acids Research 12, 387-395).

Production of Polypeptides

A polypeptide as disclosed herein may be produced by any suitable means. For example, the polypeptide may be synthesised directly using standard techniques known in the art, such as Fmoc solid phase chemistry, Boc solid phase chemistry or by solution phase peptide synthesis. Alternatively, a polypeptide may be produced by transforming a cell, typically a bacterial cell, with a nucleic acid molecule or vector which encodes said polypeptide. Production of polypeptides by expression in bacterial host cells is described below and is exemplified in the Examples. The invention provides nucleic acid molecules and vectors which encode a polypeptide of the invention. The invention also provides a host cell comprising such a nucleic acid or vector.

Exemplary polynucleotide molecules encoding the polypeptides of the present invention and others disclosed herein are provided as SEQ ID NOs: 16 to 23. Each of these sequences includes at the 5' end a codon for the N terminal methionine (ATG) and, prior to the stop codon (TAA) at the 3' end, codons for a 3× Gly linker and a 6× His histidine tag, which may optionally be excluded.

The terms "nucleic acid molecule" and "polynucleotide" are used interchangeably herein and refer to a polymeric form of nucleotides of any length, either deoxyribonucleotides or ribonucleotides, or analogs thereof. Non-limiting examples of polynucleotides include a gene, a gene fragment, messenger RNA (mRNA), cDNA, recombinant polynucleotides, plasmids, vectors, isolated DNA of any sequence, isolated RNA of any sequence, nucleic acid probes, and primers. A polynucleotide of the invention may be provided in isolated or substantially isolated form. By substantially isolated, it is meant that there may be substantial, but not total, isolation of the polypeptide from any surrounding medium. The polynucleotides may be mixed with carriers or diluents which will not interfere with their intended use and still be regarded as substantially isolated. A nucleic acid sequence which "encodes" a selected polypeptide is a nucleic acid molecule which is transcribed (in the case of DNA) and translated (in the case of mRNA) into a polypeptide in vivo when placed under the control of appropriate regulatory sequences, for example in an expression vector. The boundaries of the coding sequence are determined by a start codon at the 5' (amino) terminus and a translation stop codon at the 3' (carboxy) terminus. For the purposes of the invention, such nucleic acid sequences can include, but are not limited to, cDNA from viral, prokaryotic or eukaryotic mRNA, genomic sequences from viral or prokaryotic DNA or RNA, and even synthetic DNA sequences. A transcription termination sequence may be located 3' to the coding sequence.

Polynucleotides can be synthesised according to methods well known in the art, as described by way of example in Sambrook et al (1989, Molecular Cloning—a laboratory manual; Cold Spring Harbor Press). The nucleic acid molecules of the present invention may be provided in the form of an expression cassette which includes control sequences operably linked to the inserted sequence, thus allowing for expression of the polypeptide of the invention in vivo. These expression cassettes, in turn, are typically provided within vectors (e.g., plasmids or recombinant viral vectors). Such an expression cassette may be administered directly to a host subject. Alternatively, a vector comprising a polynucleotide of the invention may be administered to a host subject. Preferably the polynucleotide is prepared and/or administered using a genetic vector. A suitable vector may be any vector which is capable of carrying a sufficient amount of genetic information, and allowing expression of a polypeptide of the invention.

The present invention thus includes expression vectors that comprise such polynucleotide sequences. Such expression vectors are routinely constructed in the art of molecular biology and may for example involve the use of plasmid DNA and appropriate initiators, promoters, enhancers and other elements, such as for example polyadenylation signals which may be necessary, and which are positioned in the correct orientation, in order to allow for expression of a peptide of the invention. Other suitable vectors would be apparent to persons skilled in the art. By way of further example in this regard we refer to Sambrook et al.

The invention also includes cells that have been modified to express a polypeptide of the invention. Such cells typically include prokaryotic cells such as bacterial cells, for example E. coli. Such cells may be cultured using routine methods to produce a polypeptide of the invention.

A polypeptide may be derivatised or modified to assist with their production, isolation or purification. For example, where a polypeptide of the invention is produced by recombinant expression in a bacterial host cell, the sequence of the polypeptide may include an additional methionine (M) residue at the N terminus to improve expression. As another example, the polypeptide of the invention may be derivatised or modified by addition of a ligand which is capable of binding directly and specifically to a separation means. Alternatively, the polypeptide may be derivatised or modified by addition of one member of a binding pair and the separation means comprises a reagent that is derivatised or modified by addition of the other member of a binding pair. Any suitable binding pair can be used. In a preferred embodiment where the polypeptide for use in the invention is derivatised or modified by addition of one member of a binding pair, the polypeptide is preferably histidine-tagged or biotin-tagged. Typically the amino acid coding sequence of the histidine or biotin tag is included at the gene level and the polypeptide is expressed recombinantly in E. coli. The histidine or biotin tag is typically present at either end of the polypeptide, preferably at the C-terminus. It may be joined directly to the polypeptide or joined indirectly by any suitable linker sequence, such as 3, 4 or 5 glycine residues. The histidine tag typically consists of six histidine residues, although it can be longer than this, typically up to 7, 8, 9, 10 or 20 amino acids or shorter, for example 5, 4, 3, 2 or 1 amino acids.

The amino acid sequence of a polypeptide may be modified to include non-naturally occurring amino acids, for example to increase stability. When the polypeptides are produced by synthetic means, such amino acids may be introduced during production. The polypeptides may also be modified following either synthetic or recombinant production. Polypeptides may also be produced using D-amino acids. In such cases the amino acids will be linked in reverse sequence in the C to N orientation. This is conventional in the art for producing such polypeptides.

A number of side chain modifications are known in the art and may be made to the side chains of the polypeptides, subject to the polypeptides retaining any further required activity or characteristic as may be specified herein. It will also be understood that polypeptides may be chemically modified, e.g. post-translationally modified. For example, they may be glycosylated, phosphorylated or comprise modified amino acid residues.

The polypeptide may be PEGylated. The polypeptide of the invention may be in a substantially isolated form. It may be mixed with carriers or diluents (as discussed below) which will not interfere with the intended use and still be regarded as substantially isolated. It may also be in a substantially purified form, in which case it will generally comprise at least 90%, e.g. at least 95%, 98% or 99%, of the protein in the preparation.

Compositions and Formulations Comprising Polypeptides

In another aspect, the present invention provides compositions comprising a polypeptide of the invention. For example, the invention provides a composition comprising one or more polypeptides of the invention, and at least one pharmaceutically acceptable carrier or diluent. The carrier (s) must be 'acceptable' in the sense of being compatible with the other ingredients of the composition and not deleterious to a subject to which the composition is administered. Typically, carriers and the final composition, are sterile and pyrogen free.

Formulation of a suitable composition can be carried out using standard pharmaceutical formulation chemistries and methodologies all of which are readily available to the reasonably skilled artisan. For example, the agent can be combined with one or more pharmaceutically acceptable excipients or vehicles. Auxiliary substances, such as wetting or emulsifying agents, pH buffering substances, reducing agents and the like, may be present in the excipient or vehicle. Suitable reducing agents include cysteine, thioglycerol, thioreducin, glutathione and the like. Excipients, vehicles and auxiliary substances are generally pharmaceutical agents that do not induce an immune response in the individual receiving the composition, and which may be administered without undue toxicity. Pharmaceutically acceptable excipients include, but are not limited to, liquids such as water, saline, polyethyleneglycol, hyaluronic acid, glycerol, thioglycerol and ethanol. Pharmaceutically acceptable salts can also be included therein, for example, mineral acid salts such as hydrochlorides, hydrobromides, phosphates, sulfates, and the like; and the salts of organic acids such as acetates, propionates, malonates, benzoates, and the like. A thorough discussion of pharmaceutically acceptable excipients, vehicles and auxiliary substances is available in Remington's Pharmaceutical Sciences (Mack Pub. Co., N.J. 1991).

Such compositions may be prepared, packaged, or sold in a form suitable for bolus administration or for continuous administration. Injectable compositions may be prepared, packaged, or sold in unit dosage form, such as in ampoules or in multi-dose containers containing a preservative. Compositions include, but are not limited to, suspensions, solutions, emulsions in oily or aqueous vehicles, pastes, and implantable sustained-release or biodegradable formulations. Such compositions may further comprise one or more additional ingredients including, but not limited to, suspending, stabilizing, or dispersing agents. In one embodiment of a composition for parenteral administration, the active ingredient is provided in dry (for e.g., a powder or granules) form for reconstitution with a suitable vehicle (e. g., sterile pyrogen-free water) prior to parenteral administration of the reconstituted composition. The compositions may be prepared, packaged, or sold in the form of a sterile injectable aqueous or oily suspension or solution. This suspension or solution may be formulated according to the known art, and may comprise, in addition to the active ingredient, additional ingredients such as the dispersing agents, wetting agents, or suspending agents described herein. Such sterile injectable formulations may be prepared using a non-toxic parenterally-acceptable diluent or solvent, such as water or 1,3-butane diol, for example. Other acceptable diluents and solvents include, but are not limited to, Ringer's solution, isotonic sodium chloride solution, and fixed oils such as synthetic mono- or di-glycerides.

Other parentally-administrable compositions which are useful include those which comprise the active ingredient in microcrystalline form, in a liposomal preparation, or as a component of a biodegradable polymer systems. Compositions for sustained release or implantation may comprise pharmaceutically acceptable polymeric or hydrophobic materials such as an emulsion, an ion exchange resin, a sparingly soluble polymer, or a sparingly soluble salt. The compositions may be suitable for administration by any suitable route including, for example, intradermal, subcutaneous, percutaneous, intramuscular, intra-arterial, intraperitoneal, intraarticular, intraosseous, intrathecal or other appropriate administration routes. Preferred compositions are suitable for administration by intravenous infusion.

Methods of Use of Polypeptides

The invention provides for the use of polypeptides of the invention in various methods. For example, the present polypeptides may provide useful tools for biotechnology. The polypeptides may be used for specific ex vivo cleavage of IgG, in particular human IgG. In such a method, the polypeptide may be incubated with a sample containing IgG under conditions which permit the specific cysteine protease activity to occur. Specific cleavage can be verified, and the cleavage products isolated using any suitable method, such as those described in WO2003051914 and WO2009033670. Thus the method can be used in particular to generate Fc and F(ab')$_2$ fragments. Fab fragments may then be produced by carrying out a reduction step (for example in 2-mercaptoethanolamine or Cysteamine) on the F(ab')$_2$ fragments that result from cleavage of IgG with a polypeptide of the invention.

The method may also be used to detect or analyse IgG in a sample, or to remove IgG from a sample. A method for the detection of IgG in a sample typically involves incubating the polypeptide with the sample under conditions which permit IgG-specific binding and cleavage. The presence of IgG can be verified by detection of the specific IgG cleavage products, which may subsequently be analysed.

The polypeptides in accordance with the present invention may also be used in therapy or prophylaxis. In therapeutic applications, polypeptides or compositions are administered to a subject already suffering from a disorder or condition, in an amount sufficient to cure, alleviate or partially arrest the condition or one or more of its symptoms. Such therapeutic treatment may result in a decrease in severity of disease symptoms, or an increase in frequency or duration of symptom-free periods. An amount adequate to accomplish this is defined as "therapeutically effective amount". In prophylactic applications, polypeptides or compositions are administered to a subject not yet exhibiting symptoms of a disorder or condition, in an amount sufficient to prevent or delay the development of symptoms. Such an amount is defined as a "prophylactically effective amount". The subject may have been identified as being at risk of developing the disease or condition by any suitable means. Thus the invention also provides a polypeptide of the invention for use in the treatment of the human or animal body. Also provided herein is a method of prevention or treatment of disease or condition in a subject, which method comprises administering a polypeptide of the invention to the subject in a prophylactically or therapeutically effective amount. The polypeptide may be co-administered with an immuno-suppressive agent. The polypeptide is preferably administered by intravenous infusion, but may be administered by any suitable route including, for example, intradermal, subcutaneous, percutaneous, intramuscular, intra-arterial, intraperitoneal, intraarticular, intraosseous, intrathecal or other appropriate administration routes. The amount of the polypeptide that is administered may be between 0.01 mg/kg BW and 2 mg/kg BW, between 0.05 and 1.5 mg/kg BW, between 0.1 mg/kg BW and 1 mg/kg BW, preferably between 0.15 mg/kg and 0.7 mg/kg BW and most preferably between 0.2 mg/kg and 0.3 mg/kg BW, in particular 0.25 mg/kg BW. The polypeptide may be administered on multiple occasions to the same subject, provided that the quantity of ADA in the serum of the subject which is capable of binding to the polypeptide does not exceed a threshold determined by the clinician. The quantity of ADA in the serum of the subject which is capable of binding to the polypeptide may be determined by any suitable method, such as an agent specific CAP FEIA (ImmunoCAP) test or a titre assay.

Polypeptides of the invention may be particularly useful in the treatment or prevention of a disease or condition mediated by pathogenic IgG antibodies. Accordingly, the invention provides a polypeptide of the invention for use in the treatment or prevention of a disease or condition mediated by pathogenic IgG antibodies. The invention also provides a method of treating or preventing a disease or condition mediated by pathogenic IgG antibodies comprising administering to an individual a polypeptide of the invention. The method may comprise repeat administration of the said polypeptide. The invention also provides a polypeptide of the invention for use in the manufacture of a medicament for the treatment or prevention of a disease or condition mediated by pathogenic IgG antibodies, particularly an autoimmune disease which is mediated in whole or in part by pathogenic IgG antibodies.

The pathogenic antibodies may typically be specific for an antigen which is targeted in an autoimmune disease or other condition mediated wholly or in part by antibodies. Table D sets out a list of such diseases and the associated antigens. A polypeptide of the invention may be used to treat any of these diseases or conditions. The polypeptide is particularly effective for the treatment or prevention of autoimmune disease which is mediated in whole or in part by pathogenic IgG antibodies.

TABLE D

| DISEASE | AUTOANTIGENS |
|---|---|
| ABO incompatible transplantation | ABO erythrocyte antigens |
| Addison's disease | Steroid 21-hydroxylase, 17 alpha-Hydroxylase (17OH) and side-chain-cleavage enzyme (P450scc), Thyroperoxidase, thyroglobulin and H+/K(+)– |
| Anti-GBM glomerulonephritis (related to Goodpasture) | Anti-glomerular basement membrane (anti-GBM): noncollagenous (NC1) domains of the alpha3alpha4alpha5(IV) collagen |
| Anti-neutrophil cytoplasmic antibody-associated vasculitides (ANCA associated vasculitis)(Wegener granulomatosis, Churg-Strauss syndrome, microscopic polyangiitis) | Myeloperoxidase, proteinase 3 |
| Anti-NMDAR Encephalitis | N-methyl-D-aspartate receptor (NMDAR) |
| Anti-phospholipid antibody syndrome (APS) and catastrophic APS | Negatively-charged phospholipids complexed with phospholipid binding plasma proteins (e.g. beta2GPI), cardiolipin, beta2-glycoprotein I, and (beta2GPI) |
| Autoimmune bullous skin diseases (Pemphigus). Pemphigus foliaceus (PF), fogo selvagem (FS)(endemic form), pemphigus vulgaris (PV) | IgG against keratinocytes. Specific target is desmoglein (Dsg) 1 (desmosomal Cadherins) |
| Autoimmune hemolytic anemia (AIHA) | Self-antigens on red-blood-cells |
| Autoimmune hepatitis (AIH) | Actin, antinuclear antibody (ANA), smooth muscle antibody (SMA), liver/kidney microsomal antibody (LKM-1), anti soluble liver antigen (SLA/LP) and anti-mitochondrial antibody (AMA), CYP2D6, CYP2C9-tienilic acid, UGT1A, CYP1A2, CYP2A6, CYP3A, CYP2E1, CYP11A1, CYP17 and CYP21 |
| Autoimmune neutropenia (AIN) | FcgRIIIb |
| Bullous pemphigoid (BP) | Hemidesmosomal proteins BP230 and BP180 (type XVII collagen), laminin 5, the alpha6 subunit of the integrin alpha6beta4 and p200 |
| Celiac disease | transglutaminase 2 (TG2), transglutaminase 3, actin, ganglioside, collagen, calreticulin and zonulin, thyroid, endocrine pancreas, anti-gastric and liver, anti-nuclear constituents, anti-reticulin, actin, smooth muscle, calreticulin, desmin, collagens, bone, anti-brain, ganglioside, neuronal, blood vessel |
| Chronic utricaria | Alpha-subunit of the high-affinity IgE receptor, IgE |
| Complete congenital heart block (CCHB) | Ro (Sjögens syndrome antigen A (SSA)), La (Sjögens syndrome antigen B(SSB)) |
| Diabetes type 1A (T1DM) | Islet cell autoantibodies (ICA), antibodies to insulin (IAA), glutamic acid decarboxylase (GAA or GAD), protein tyrosine phosphatase (IA2 or ICA512), Insulinoma Associated Peptide-2. The number of antibodies, rather than the individual antibody, is thought to be most predictive of progression to overt diabetes. |
| Epidermolysis bullosa acquisita (EBA) | The 145-kDa noncollagenous aminoterminal (NC-1) domain of collagen VII |
| Essential mixed cryoglobulinemia | Essential mixed cryoglobulinemia antigens |
| Goodpasture's syndrome (also known as Goodpasture's disease and anti-glomerular basement membrane disease | alpha3(IV) collagen (=Goodpasture antigen) |
| Graves' disease (Basedow's disease), includes Goitre and hyperthyroidism, infiltrative exopthalmos and infiltarative dermopathy. | Thyrotropin receptor (TSHR) Thyroid peroxidase (TPO) |

TABLE D-continued

| DISEASE | AUTOANTIGENS |
|---|---|
| Guillain-Barré syndrome (GBS), Acute inflammatory demyelinating polyneuropathy (AIDP), acute motor axonal neuropathy (AMAN) | Gangliosides GM1, GM1b, GD1a, and GalNAc-GD1a, glycosphingolipid, myelin proteins PMP22 and P0 |
| Hemophilia-Acquired FVIII deficiency | Factor VIII |
| IgA nephritis | |
| Idiopathic thrombocytopenic purpura (ITP) | Platelet glycoprotein (GP) IIb-IIIa and/or GPIb-IX |
| Lambert-Eaton myasthenic syndrome (LEMS) | voltage gated calcium channels |
| Mixed Connective Tissue Disease (MCTD) | IgG directed against the spliceosome, U1-snRNP |
| Multiple Myeloma | Multiple Myeloma antigens |
| Myasthenia gravis Myasthenic crisis | Acetylcholine receptors (AchR), muscle-specific kinase (MuSK) |
| Myocarditis, dilated cardiomyopathy (DCM)(congestive cardiomyopathy) | heart-reactive autoantibodies against multiple antigens e.g. cardiac myosin |
| Neuromyelitis Optica (NMO) | Aquaporin 4 (AQP4) |
| Primary biliary cirrhosis (PBC) | pyruvate dehydrogenase complex (PDC)-E2 and other members of the oxaloacid dehydrogenase family, Glycoprotein-210, p62, sp100 |
| Primary Progressive Multiple Sclerosis (PPMS) | Myelin oligodendrocyte glycoprotein (MOG), Myelin proteolipid protein (PLP), transketolase (TK), cyclic nucleotide phosphodiesterase type I (CNPase I), collapsin response mediator protein 2, tubulin beta4, neurofascin |
| Rheumatic heart disease (RHD), (Rheumatic fever) | Cardiac myosin |
| Rheumatoid Arthritis (R.A) | Type II collagen, citrullin (-ated proteins (e.g. (fibrinogen, vimentin, filaggrin, type II collagen, enolase)), G6PI, RFs (anti-Fc/IgG), Vimentin, and cytokeratin |
| Serum-sickness, immune complex hypersensitivity (type III) | Various antigens |
| Sjögren Syndrome (SS) | Ro (Sjögens syndrome antigen A (SS-A)), La (Sjögens syndrome antigen B(SS-B)), p80 coilin, antinuclear antibodies, anti-thyroid, anti-centromere antibodies (Raynaud's phenomenon), anti-carbonic anhydrase II (distal renal tubular acidosis), anti-mitochondrial antibodies (liver pathology), cryoglobulins (evolution to non-Hodgkin's lymphoma), alpha- and beta-fodrin, islet cell autoantigen, poly(ADP)ribose polymerase (PARP), NuMA, Golgins, NOR-90, M3-muscarinic receptor |
| SLE including Lupus nephritis | Autoantibodies to nuclear constituents (e.g. dsDNA and nucleosomes), dsDNA, PARP, Sm, PCDA, rRNA Ribosome P proteins, C1q |
| Stiff-person syndrome (SPS) | glutamic acid decarboxylase (GAD), amphiphysin. |
| Systemic sclerosis (scleroderma) | DNA-topoisomerase I (Scl-70), U3 snRNP, U2 snRNP, 7-2 RNP, NOR-90, centromere-associated proteins, and nucleolar antigens, Anti-Th/To, Anti-RNA polymerase I/III, Anti-PDGF receptor, Anti-fibrillin-1, M3-muscarinic receptor, |
| Transplant rejection | Transplant rejection antigens |
| Thrombotic Thrombocytopenic Purpura (TTP) | ADAMTS13 |
| Wegener's granulomatosis (granulomatosis with polyangiitis) | |
| Anti-drug antibodies (ADA) | Any treatment which suffers from reduced efficacy due to the presence of antibodies specific for the therapeutic agent. Includes, for example, antibody-based therapeutics, gene therapy vectors, cell therapies including adoptive cell transfer (ACT) immunotherapies e.g. using CAR-T cells |

In another embodiment, a polypeptide of the invention may be used in a method to improve the benefit to a subject of a therapy or a therapeutic agent. The method comprises two steps, which are referred to herein as steps (a) and (b).

Step (a) comprises administering to the subject a polypeptide of the invention. The amount of the polypeptide administered is preferably sufficient to cleave substantially all IgG molecules present in the plasma of the subject. Step (b) comprises subsequently administering to the subject the said therapy or therapeutic agent. Steps (a) and (b) are separated by a time interval which is preferably sufficient for cleavage of substantially all IgG molecules present in the plasma of the subject to take place. The said interval may typically be of at least 30 minutes and at most 21 days.

The therapeutic agent of which the benefit is improved is typically an antibody which is administered for the treatment of cancer or another disease. The therapeutic agent may be IVIg. In the context of this embodiment, the invention may be alternatively described as providing a method for the treatment of cancer or another disease in a subject, the method comprising (a) administering to the subject a polypeptide of the invention; and (b) subsequently administering to the subject a therapeutically effective amount of an antibody which is a treatment for said cancer or said other disease; wherein:

the amount of said polypeptide administered is sufficient to cleave substantially all IgG molecules present in the plasma of the subject; and steps (a) and (b) are separated by a time interval of at least 30 minutes and at most 21 days.

In other words, the invention also provides the polypeptide for use in such a method for the treatment of cancer or another disease. The invention also provides use of the agent in the manufacture of a medicament for the treatment of cancer or another disease by such a method. The cancer may be Acute lymphoblastic leukemia, Acute myeloid leukemia, Adrenocortical carcinoma, AIDS-related cancers, AIDS-related lymphoma, Anal cancer, Appendix cancer, Astrocytoma, childhood cerebellar or cerebral, Basal cell carcinoma, Bile duct cancer, extrahepatic, Bladder cancer, Bone cancer, Osteosarcoma/Malignant fibrous histiocytoma, Brainstem glioma, Brain cancer, Brain tumor, cerebellar astrocytoma, Brain tumor, cerebral astrocytoma/malignant glioma, Brain tumor, ependymoma, Brain tumor, medulloblastoma, Brain tumor, supratentorial primitive neuroectodermal tumors, Brain tumor, visual pathway and hypothalamic glioma, Breast cancer, Bronchial adenomas/carcinoids, Burkitt lymphoma, Carcinoid tumor, Carcinoid tumor, gastrointestinal, Carcinoma of unknown primary, Central nervous system lymphoma, Cerebellar astrocytoma, Cerebral astrocytoma/Malignant glioma, Cervical cancer, Chronic lymphocytic leukemia, Chronic myelogenous leukemia Chronic myeloproliferative disorders, Colon Cancer, Cutaneous T-cell lymphoma, Desmoplastic small round cell tumor, Endometrial cancer, Ependymoma, Esophageal cancer, Ewing's sarcoma in the Ewing family of tumors, Extracranial germ cell tumor, Childhood, Extragonadal Germ cell tumor, Extrahepatic bile duct cancer, Eye Cancer, Intraocular melanoma, Eye Cancer, Retinoblastoma, Gallbladder cancer, Gastric (Stomach) cancer, Gastrointestinal Carcinoid Tumor, Gastrointestinal stromal tumor (GIST). Germ cell tumor: extracranial, extragonadal, or ovarian, Gestational trophoblastic tumor, Glioma of the brain stem, Glioma, Childhood Cerebral Astrocytoma, Glioma, Childhood Visual Pathway and Hypothalamic, Gastric carcinoid, Hairy cell leukemia, Head and neck cancer, Heart cancer, Hepatocellular (liver) cancer, Hodgkin lymphoma, Hypopharyngeal cancer, Hypothalamic and visual pathway glioma, Intraocular Melanoma, Islet Cell Carcinoma (Endocrine Pancreas), Kaposi sarcoma, Kidney cancer (renal cell cancer), Laryngeal Cancer, Leukemias, Leukemia, acute lymphoblastic (also called acute lymphocytic leukemia), Leukemia, acute myeloid (also called acute myelogenous leukemia), Leukemia, chronic lymphocytic (also called chronic lymphocytic leukemia), Leukemia, chronic myelogenous (also called chronic myeloid leukemia), Leukemia, hairy cell, Lip and Oral Cavity Cancer, Liposarcoma, Liver Cancer (Primary), Lung Cancer, Non-Small Cell Lung Cancer, Small Cell, Lymphomas, Lymphoma, AIDS-related, Lymphoma, Burkitt, Lymphoma, cutaneous T-Cell, Lymphoma, Hodgkin, Lymphomas. Non-Hodgkin (an old classification of all lymphomas except Hodgkin's), Lymphoma, Primary Central Nervous System, Macroglobulinemia, Waldenstrom, Malignant Fibrous Histiocytoma of Bone/Osteosarcoma, Medulloblastoma, Melanoma, Melanoma, Intraocular (Eye), Merkel Cell Carcinoma, Mesothelioma, Adult Malignant, Mesothelioma, Metastatic Squamous Neck Cancer with Occult Primary, Mouth Cancer, Multiple Endocrine Neoplasia Syndrome, Multiple Myeloma/Plasma Cell Neoplasm, Mycosis Fungoides, Myelodysplastic Syndromes, Myelodysplastic/Myeloproliferative Diseases. Myelogenous Leukemia, Chronic, Myeloid Leukemia, Adult Acute, Myeloid Leukemia, Childhood Acute, Myeloma, Multiple (Cancer of the Bone-Marrow), Myeloproliferative Disorders, Nasal cavity and paranasal sinus cancer, Nasopharyngeal carcinoma, Neuroblastoma, Non-Hodgkin lymphoma, Non-small cell lung cancer, Oral Cancer, Oropharyngeal cancer, Osteosarcoma/malignant fibrous histiocytoma of bone, Ovarian cancer, Ovarian epithelial cancer (Surface epithelial-stromal tumor), Ovarian germ cell tumor, Ovarian low malignant potential tumor, Pancreatic cancer, Pancreatic cancer, islet cell, Paranasal sinus and nasal cavity cancer, Parathyroid cancer, Penile cancer, Pharyngeal cancer, Pheochromocytoma, Pineal astrocytoma, Pineal germinoma, Pineoblastoma and supratentorial primitive neuroectodermal tumors, Pituitary adenoma, Plasma cell neoplasia/Multiple myeloma, Pleuropulmonary blastoma, Primary central nervous system lymphoma, Prostate cancer, Rectal cancer, Renal cell carcinoma (kidney cancer), Renal pelvis and ureter, transitional cell cancer, Retinoblastoma, Rhabdomyosarcoma, Salivary gland cancer, Sarcoma, Ewing family of tumors, Kaposi Sarcoma, Sarcoma, soft tissue, Sarcoma, uterine, Sézary syndrome, Skin cancer (nonmelanoma), Skin cancer (melanoma), Skin carcinoma, Merkel cell, Small cell lung cancer. Small intestine cancer, Soft tissue sarcoma, Squamous cell carcinoma, Squamous neck cancer with occult primary, metastatic, Stomach cancer, Supratentorial primitive neuroectodermal tumor, T-Cell lymphoma, cutaneous—see Mycosis Fungoides and Sézary syndrome, Testicular cancer, Throat cancer. Thymoma. Thymoma and Thymic carcinoma, Thyroid cancer, Thyroid cancer, Transitional cell cancer of the renal pelvis and ureter, Trophoblastic tumor, Ureter and renal pelvis, transitional cell cancer Urethral cancer, Uterine cancer, endometrial, Uterine sarcoma, Vaginal cancer, Visual pathway and hypothalamic glioma. Vulvar cancer. Waldenström macroglobulinemia and Wilms tumor (kidney cancer).

The cancer is preferably prostate cancer, breast cancer, bladder cancer, colon cancer, rectal cancer, pancreatic cancer, ovarian cancer, lung cancer, cervical cancer, endometrial cancer, kidney (renal cell) cancer, oesophageal cancer, thyroid cancer, skin cancer, lymphoma, melanoma or leukemia.

The antibody administered in step (b) is preferably specific for a tumour antigen associated with one or more of the above cancer types. Targets of interest for an antibody for use in the method include CD2, CD3, CD19, CD20, CD22, CD25, CD30, CD32, CD33, CD40, CD52, CD54, CD56, CD64, CD70, CD74, CD79, CD80, CD86, CD105, CD138, CD174, CD205, CD227, CD326, CD340, MUC16, GPNMB, PSMA, Cripto, ED-B, TMEFF2, EphA2, EphB2, FAP, αv integrin, Mesothelin, EGFR, TAG-72, GD2, CAIX, 5T4, a407 integrin, Her2. Other targets are cytokines, such as interleukins IL-1 through IL-13, tumour necrosis factors α & β, interferons α, β and γ, tumour growth factor Beta (TGF-β), colony stimulating factor (CSF) and granulocyte monocyte colony stimulating factor (GMCSF). See Human Cytokines: Handbook for Basic & Clinical Research (Aggrawal et al. eds., Blackwell Scientific, Boston, MA 1991). Other targets are hormones, enzymes, and intracellular and intercellular messengers, such as, adenylyl cyclase, guanyl cyclase, and phospholipase C. Other targets of interest are leukocyte antigens, such as CD20, and CD33. Drugs may also be targets of interest. Target molecules can be human, mammalian or bacterial. Other targets are antigens, such as proteins, glycoproteins and carbohydrates from microbial pathogens, both viral and bacterial, and tumors. Still other targets are described in U.S. Pat. No. 4,366,241.

The antibody may be attached directly or indirectly to a cytotoxic moiety or to a detectable label. The antibody may be administered via one or more routes of administration using one or more of a variety of methods known in the art. The route and/or mode of administration will vary depending upon the desired results. Preferred routes of administration for antibodies include intravenous, intramuscular, intradermal, intraperitoneal, subcutaneous, spinal or other parenteral routes of administration, for example by injection or infusion. The phrase "parenteral administration" as used herein means modes of administration other than enteral and topical administration, usually by injection. Alternatively, an antibody can be administered via a non-parenteral route, such as a topical, epidermal or mucosal route of administration. Local administration is also preferred, including peritumoral, juxtatumoral, intratumoral, intralesional, perilesional, intra cavity infusion, intravesical administration, and inhalation.

A suitable dosage of an antibody of the invention may be determined by a skilled medical practitioner. Actual dosage levels of an antibody may be varied so as to obtain an amount of the active ingredient which is effective to achieve the desired therapeutic response for a particular patient, composition, and mode of administration, without being toxic to the patient. The selected dosage level will depend upon a variety of pharmacokinetic factors including the activity of the particular antibody employed, the route of administration, the time of administration, the rate of excretion of the antibody, the duration of the treatment, other drugs, compounds and/or materials used in combination with the particular compositions employed, the age, sex, weight, condition, general health and prior medical history of the patient being treated, and like factors well known in the medical arts.

A suitable dose of an antibody may be, for example, in the range of from about 0.1 µg/kg to about 100 mg/kg body weight of the patient to be treated. For example, a suitable dosage may be from about 1 µg/kg to about 10 mg/kg body weight per day or from about 10 µg/kg to about 5 mg/kg body weight per day.

Dosage regimens may be adjusted to provide the optimum desired response (e.g., a therapeutic response). For example, a single bolus may be administered, or step (b) of the method may comprise several divided doses administered over time or the dose may be proportionally reduced or increased as indicated by the exigencies of the therapeutic situation, provided the required interval between steps (a) and (b) is not exceeded. It is especially advantageous to formulate parenteral compositions in dosage unit form for ease of administration and uniformity of dosage. Dosage unit form as used herein refers to physically discrete units suited as unitary dosages for the subjects to be treated; each unit contains a predetermined quantity of active compound calculated to produce the desired therapeutic effect in association with the required pharmaceutical carrier.

The antibody of step (b) may be administered in combination with chemotherapy or radiation therapy. The method may further comprise the administration of an additional anti-cancer antibody or other therapeutic agent, which may be administered together with the antibody of step (b) in a single composition or in separate compositions as part of a combined therapy. For example, the antibody of step (b) may be administered before, after or concurrently with the other agent.

The antibody may be Abagovomab, Abciximab, Actoxumab, Adalimumab, Adecatumumab, Afelimomab, Afutuzumab, Alacizumab pegol, ALD518, Alemtuzumab, Alirocumab, Altumomab pentetate, Amatuximab, Anatumomab mafenatox, Anrukinzumab, Apolizumab, Arcitumomab, Aselizumab, Atinumab, Atlizumab (=tocilizumab), Atorolimumab, Bapineuzumab, Basiliximab, Bavituximab, Bectumomab, Belimumab, Benralizumab, Bertilimumab, Besilesomab, Bevacizumab, Bezlotoxumab, Biciromab, Bimagrumab, Bivatuzumab mertansine, Blinatumomab, Blosozumab, Brentuximab vedotin, Briakinumab, Brodalumab, Canakinumab, Cantuzumab mertansine, Cantuzumab ravtansine, Caplacizumab, Capromab pendetide, Carlumab, Catumaxomab, CC49, Cedelizumab, Certolizumab pegol, Cetuximab, Ch.14.18, Citatuzumab bogatox, Cixutumumab, Clazakizumab, Clenoliximab, Clivatuzumab tetraxetan, Conatumumab, Concizumab, Crenezumab, CR6261, Dacetuzumab. Daclizumab, Dalotuzumab, Daratumumab, Demcizumab, Denosumab, Detumomab, Dorlimomab aritox, Drozitumab, Duligotumab, Dupilumab, Dusigitumab, Ecromeximab, Eculizumab, Edobacomab, Edrecolomab, Efalizumab, Efungumab, Elotuzumab Elsilimomab, Enavatuzumab, Enlimomab pegol, Enokizumab, Enoticumab, Ensituximab, Epitumomab cituxetan, Epratuzumab, Erlizumab, Ertumaxomab, Etaracizumab, Etrolizumab, Evolocumab, Exbivirumab, Fanolesomab, Faralimomab Farletuzumab, Fasinumab, FBTA05, Felvizumab, Fezakinumab, Ficlatuzumab, Figitumumab, Flanvotumab, Fontolizumab, Foralumab, Foravirumab, Fresolimumab, Fulranumab, Futuximab, Galiximab, Ganitumab, Gantenerumab, Gavilimomab, Gemtuzumab ozogamicin, Gevokizumab, Girentuximab, Glembatumumab vedotin, Golimumab, Gomiliximab, GS6624, Ibalizumab, Ibritumomab tiuxetan, Icrucumab, Igovomab, Imciromab, Imgatuzumab, Inclacumab, Indatuximab ravtansine, Infliximab, Intetumumab, Inolimomab, Inotuzumab ozogamicin, Ipilimumab. Iratumumab, Itolizumab. Ixekizumab, Keliximab, Labetuzumab, Lampalizumab, Lebrikizumab, Lemalesomab, Lerdelimumab, Lexatumumab, Libivirumab, Ligelizumab, Lintuzumab, Lirilumab, Lodelcizumab, Lorvotuzumab mertansine, Lucatumumab, Lumiliximab, Mapatumumab, Maslimomab, Mavrilimumab, Matuzumab, Mepolizumab, Metelimumab, Milatuzumab. Minretumomab, Mitumomab, Mogamulizumab, Morolimumab, Motavizumab, Moxetumomab pasudotox, Muromonab-CD3, Nacolomab tafenatox, Namilumab, Naptumomab estafenatox, Narnatumab, Natalizumab, Nebacumab, Necitumumab, Nerelimomab, Nesvacumab, Nimotuzumab, Nivolumab, Nofetumomab merpentan, Obinutuzumab, Ocaratuzumab, Ocrelizumab, Odulimomab, Ofatumumab, Olaratumab, Olokizumab, Omalizumab, Onartuzumab, Oportuzumab monatox, Oregovomab, Orticumab, Otelixizumab, Oxelumab, Ozanezumab, Ozoralizumab, Pagibaximab, Palivizumab, Panitumumab, Panobacumab, Parsatuzumab, Pascolizumab, Pateclizumab, Patritumab, Pemtumomab, Perakizumab, Pertuzumab, Pexelizumab, Pidilizumab, Pinatuzumab vedotin, Pintumomab, Placulumab, Polatuzumab vedotin, Ponezumab, Priliximab, Pritoxaximab, Pritumumab, PRO 140, Quilizumab, Racotumomab, Radretumab, Rafivirumab, Ramucirumab, Ranibizumab, Raxibacumab, Regavirumab, Reslizumab, Rilotumumab, Rituximab, Robatumumab, Roledumab, Romosozumab, Rontalizumab, Rovelizumab, Ruplizumab, Samalizumab, Sarilumab, Satumomab pendetide, Secukinumab, Seribantumab, Setoxaximab, Sevirumab, Sibrotuzumab, Sifalimumab, Siltuximab, Simtuzumab, Siplizumab, Sirukumab, Solanezumab, Solitomab, Sonepcizumab, Sonmuzumab, Stamulumab, Sulesomab, Suvizumab, Tabalumab, Tacatuzumab tetraxetan, Tadocizumab, Talizumab, Tanezumab, Taplitumomab paptox, Tefibazumab, Telimomab aritox, Tenatumomab, Teneliximab, Teplizumab, Teprotumumab, TGN1412, Ticilimumab (=tremelimumab), Tildrakizumab, Tigatuzumab, TNX-650, Tocilizumab (=atlizumab), Toralizumab, Tositumomab, Tralokinumab, Trastuzumab, TRBS07, Tregalizumab, Tremelimumab Tucotuzumab celmoleukin, Tuvirumab, Ublituximab. Urelumab, Urtoxazumab, Ustekinumab, Vapaliximab, Vatelizumab, Vedolizumab, Veltuzumab, Vepalimomab Vesencumab, Visilizumab, Volociximab, Vorsetuzumab mafodotin, Votumumab, Zalutumumab, Zanolimumab, Zatuximab, Ziralimumab or Zolimomab aritox.

Preferred antibodies include Natalizumab, Vedolizumab, Belimumab, Atacicept, Alefacept, Otelixizumab, Teplizumab, Rituximab, Ofatumumab, Ocrelizumab, Epratuzumab, Alemtuzumab, Abatacept, Eculizumab, Omalizumab, Canakinumab, Meplizumab, Reslizumab, Tocilizumab, Ustekinumab, Briakinumab, Etanercept, Infliximab, Adalimumab, Certolizumab pegol, Golimumab, Trastuzumab, Gemtuzumab, Ozogamicin, Ibritumomab, Tiuxetan, Tostitumomab, Cetuximab, Bevacizumab, Panitumumab, Denosumab, Ipilimumab, Brentuximab and Vedotin.

The therapy of which the benefit is improved is typically an organ transplant. The organ may be selected from kidney, liver, heart, pancreas, lung, or small intestine. The subject to be treated may preferably be sensitized or highly sensitized. By "sensitized" it is meant that the subject has developed antibodies to human major histocompatibility (MHC) antigens (also referred to as human leukocyte antigens (HLA)). The anti-HLA antibodies originate from allogenically sensitized B cells and are usually present in patients that have previously been sensitized by blood transfusion, previous transplantation or pregnancy (Jordan et al., 2003).

Whether or not a potential transplant recipient is sensitized may be determined by any suitable method. For example, a Panel Reactive Antibody (PRA) test may be used to determine if a recipient is sensitized. A PRA score >30% is typically taken to mean that the patient is "high immunologic risk" or "sensitized". Alternatively, a cross-match test may be conducted, in which a sample of the potential transplant donor's blood is mixed with that of the intended recipient. A positive cross-match means that the recipient has antibodies which react to the donor sample, indicating that the recipient is sensitized and transplantation should not occur. Cross-match tests are typically conducted as a final check immediately prior to transplantation.

The presence of high titer antibodies against MHC antigens of the potential donor (i.e. donor specific antibodies (DSA)) is a direct contraindication to transplantation because of the risk of acute antibody-mediated rejection. In short, sensitization to donor MHC antigens hampers the identification of a suitable donor. A positive cross-match test is an unambiguous barrier to transplantation. Since approximately one third of patients waiting for kidney transplantation are sensitized, with as many as 15% being highly sensitized, this leads to an accumulation of patients waiting for transplant. In the US, the median time on the waiting list for renal transplantation in 2001-2002 was 1329 days for those with Panel Reactive Antibody (PRA) score 0-9%, 1920 days for those with PRA 10-79%, and 3649 days for those with PRA 80% or greater (OPTN-database, 2011).

One accepted strategy to overcome the DSA barrier is to apply plasma exchange or immune adsorption, often in combination with e.g. intravenous gamma globulin (IVIg) or Rituximab, to lower the levels of DSA to a level where transplantation can be considered (Jordan et al., 2004; Montgomery et al., 2000; Vo et al., 2008a; Vo et al., 2008b). However, plasma exchange, immune adsorption and IVIg treatments have the disadvantage of being inefficient and requiring rigorous planning since they involve repeated treatments over an extended period of time. When an organ from a deceased donor becomes available it has to be transplanted within hours since prolonged cold ischemia time is one of the most important risk factors for delayed graft function and allograft loss in renal transplantation (Ojo et al., (1997) Transplantation 63:968-74).

By contrast, the method of the present invention allows the rapid, temporary and safe removal of DSAs in a potential transplant recipient. Administering the polypeptide of the invention just prior to transplantation has the capacity to effectively desensitize a highly sensitized patient, thereby allowing transplantation and avoiding acute antibody-mediated rejection. A single dose of polypeptide prior to transplantation will enable transplantation of thousands of patients with donor specific IgG antibodies.

In the context of this embodiment, the method may be alternatively described as a method for the treatment of organ failure in a subject, the method comprising (a) administering to the subject a polypeptide of the invention and (b) subsequently transplanting a replacement organ into the subject; wherein:

the amount of said polypeptide administered is sufficient to cleave substantially all IgG molecules present in the plasma of the subject; and steps (a) and (b) are separated by a time interval of at least 30 minutes and at most 21 days.

In other words, this embodiment may be described as a method for preventing rejection of a transplanted organ in a subject, particularly acute antibody-mediated transplant rejection, the method comprising, at least 30 minutes and at most 21 days prior to transplantation of the organ, administering to the subject a polypeptide of the invention, wherein the amount of said polypeptide administered is sufficient to cleave substantially all IgG molecules present in the plasma of the subject. The invention also provides use of the polypeptide of the invention in such a method of treating organ failure or preventing transplant rejection, particularly acute antibody-mediated transplant rejection. The invention also provides use of the polypeptide of the invention in the manufacture of a medicament for the treatment of organ failure or for the prevention of transplant rejection by such a method. In this embodiment, the method of the invention may additionally comprise a step conducted at or immediately prior to transplantation, which step comprises induction suppression of T cells and/or B cells in the patient. Said induction suppression may typically comprise administering an effective amount of an agent which kills or inhibits T cells, and/or administering an effective amount of an agent which kills or inhibits B cells. Agents which kill or inhibit T cells include Muromonab, Basiliximab, Daclizumab, an antithymocyte globulin (ATG) antibody and a lymphocyte immune globulin, anti-thymocyte globulin preparation (AT-GAM). Rituximab is known to kill or inhibit B cells.

Polypeptides having IgG cysteine protease activity, such as the polypeptides of the present invention, may also be useful in methods for the induction for hematopoietic chimerism in a subject, for example, in the context of transplants of hematopoietic stem/progenitor cells (HSPC) to a subject. As such a polypeptide of the present invention may be used in a method for the induction of hematopoietic chimerism in a subject, the method comprising conducting the conditioning regimen of the invention and subsequently administering HSPC to the subject in an amount sufficient and under conditions suitable to induce hematopoietic chimerism in the subject. The method may alternatively be described as a method for the stable transplantation of HSPC. The HSPC may be autologous (the subject/patient's own cells are used) or syngeneic (the cells are from a genetically identical twin), or they may be allogeneic (the cells come from a separate, non-identical donor). Immune complications which reduce the likelihood of successful engraftment of HSPC in the recipient are most significant for allogeneic cells and thus the method for the induction of hematopoietic chimerism is of greatest benefit with such cells. However, immune complications can occur even with autologous cells if there is expression of a product to which the recipient has not previously been exposed. If an autologous cell has been genetically modified to express a gene therapy, the cell may be sufficiently altered to provoke an immune response. For example there may be an immune response to the expressed gene therapy product. Similar would apply if the HSPC has been genetically modified to express a different HLA type which is not matched to the HLA of the recipient.

Polypeptides having IgG cysteine protease activity, such as the polypeptides of the present invention, may also be used in combination with an adoptive cell transfer immunotherapy. The efficacy of adoptive cell transfer immunotherapies may be reduced by the limited survival and limited sustained activity of the transferred cells, such as CAR-T cells. Proteins with IgG cysteine protease may protect transferred cells. In particular, pre-existing antibodies and antibodies generated after dosing with transferred cells may cut short the potential of transferred cells and the therapeutic effect of the transferred cells will profit from the removal of antibody effector functions through the conditioning of the recipient. Therefore, administering proteins with IgG cysteine protease activity may increase the survival and activity of transferred cells, consequently improving the benefit to a patient of an adoptive cell transfer immunotherapy and provide improved therapy and prognosis in the context of e.g. cancer treatment. In this context, a method of treating cancer may comprise administering the polypeptide of the present invention having IgG cysteine protease activity before and/or after administering one or more doses of an adoptive cell transfer immunotherapy. Polypeptides having IgG cysteine protease activity, such as the polypeptides of the present invention, may also be used in combination with an adoptive cell transfer immunotherapy in the context of methods of treating autoimmune conditions, infections, and conditions mediated by deleterious antibodies. Such methods will allow both pre-existing anti-drug antibodies (ADA) and antibodies elicited by the adoptive cell transfer immunotherapy to be inactivated.

EXAMPLES

Unless indicated otherwise, the methods used are standard biochemistry and molecular biology techniques. Examples of suitable methodology textbooks include Sambrook et al., Molecular Cloning, A Laboratory Manual (1989) and Ausubel et al., Current Protocols in Molecular Biology (1995), John Wiley and Sons, Inc.

Example 1—Expression and Purification of pCART239

The mature IdeZ molecule and sequence were analysed and regions suitable for mutation were identified. In some cases an in silico assessment was used to evaluate the likely outcome of a mutation. Having decided on the sequence of pCART239, cDNA encoding each polypeptide were generated at GeneCust, Luxembourg either by site-directed mutation of a starting sequence or synthesis depending on the number of mutations introduced. cDNA were sequenced and transferred to the pET9a expression vector (Novagen) in frame with a C-terminal 6× His-tag, joined to the C-terminus by a short glycine linker (3× Gly). N-terminal methionine was added for bacterial expression. The pCART239 polypeptide is therefore equivalent to SEQ ID NO: 1 with an additional (1) N-terminal methionine and (2) C-terminal 6× His-tag, joined to the C-terminus by a short glycine linker (3× Gly).

The pCART239 expression plasmid was transformed into E. coli T7E2 (SOURCE) and seeded on LB agarose plates containing 50 μg/ml kanamycin. Single colonies were picked and overnight cultures (10 ml LB-medium) were started at 37° C., 250 rpm. The following day 2 flasks containing 125 ml of LB-medium+50 μg/ml Kanamycin+1:100,000 diluted antifoam were inoculated with 5 ml of the overnight culture. The culture flask was already at 37° C. at the time of inoculation, and the cultures were grown until OD 0.6-0.7 (37° C., 300 rpm). At this point IPTG (final concentration 1 mM) was added to induce expression and the cultures were incubated further for at least 2 hours. Following incubation, bacterial suspensions were harvested by centrifugation (10 min, 4000×g, 4° C.) and the supernatants discarded. The pellets were washed once in PBS (30 ml), re-centrifuged to discard the supernatant and the final pellets were frozen at −20° C. and kept in freezer over night. For lysis of bacteria either a Panda Plus 2000 homogenizer, (GEA) was used according to the instructions from the manufacturer or a freeze-thaw protocol was used (three freeze/thaw cycles in 10 ml PBS and with the aid of sterile glass beads). Following the freeze/thaw cycles, the tubes were centrifuged (20 min, 25 000×g, 4° C.) to isolate the bacterial lysate (the supernatant) which was then stored on ice. The final bacterial lysates were pooled and sterile filtered through 0.2 μm nylon filter (HPF Millex®-Nylon) and the protein was purified using Ni-NTA pre-packed spin-columns (ThermoFisher). After purification DTT (final concentration 5 mM) and EDTA (final concentration 5 mM) were added to the eluate prior to buffer exchange (Amicon Ultra-4 10K). Protein concentrations were measured using NanoDrop 2000 spectrophotometer (Thermo Scientific). The purity and stability of purified proteins during the expression purification process were evaluated with sodium dodecyl sulphate polyacrylamide gel electrophoresis (SDS-PAGE) using stainless 12% Mini-PROTEAN®TGX™ precast gel (Biorad) (FIG. 1). FIG. 1A shows that IPTG induction and subsequent overexpression of pCART239 was successful. FIG. 1B shows that the purification process was also successful and led to a pCART239 sample of high purity and stability.

Example 2—Efficacy of pCART207, pCART229, N240, pCART242 Against Humira (IgG1) and XGEVA (IgG2)

In this example human IgG1 is represented by Humira (Abbvie) and IgG2 by XGEVA (Amgen). These are used to compare the activity of the IdeZ variants as well as the IdeS positive control in cleavage of monoclonal human IgG. The IdeZ variant enzymes (and IdeS) were titrated in 0.05% BSA in PBS in 1:3 dilution steps from a starting concentration of 3.3 μg/ml and the cleavage products were analysed by SDS-PAGE (4-20% gradient gel). The pCART242 polypeptide tested is equivalent to SEQ ID NO: 2 with an additional (1) N-terminal methionine and (2) C-terminal 6× His-tag, joined to the C-terminus by a short glycine linker (3× Gly).
Methods:
1. 25 µl of the enzyme and control (buffer) dilutions were transferred to a multititre plate.
2. The reaction was started by adding 25 µl of 2 mg/ml solution of Humira or XGEVA to each well. This resulted in 1 mg/ml of each antibody in the reaction. Taking into account the serial dilutions, the maximum IdeZ (or IdeS) concentration tested was 3.3 µg/ml down to a minimum of 0.057 ng/ml.
3. The plates are incubated at 37° C. on slow rotation for 2 hours.
4. Following incubation, 10 µl of each sample were mixed with 30 µl 2×SDS loading buffer in microtiter plates. Following overnight storage (4-8° C.), this was transferred to 1.5 ml tubes and incubated at 92° C. for 5 min and 10 µl sample was loaded on a 15-well 4-20% Mini-PROTEAN@TGX™ precast gel and the samples were analysed in SDS-PAGE under non-reducing conditions.

Figure 2:
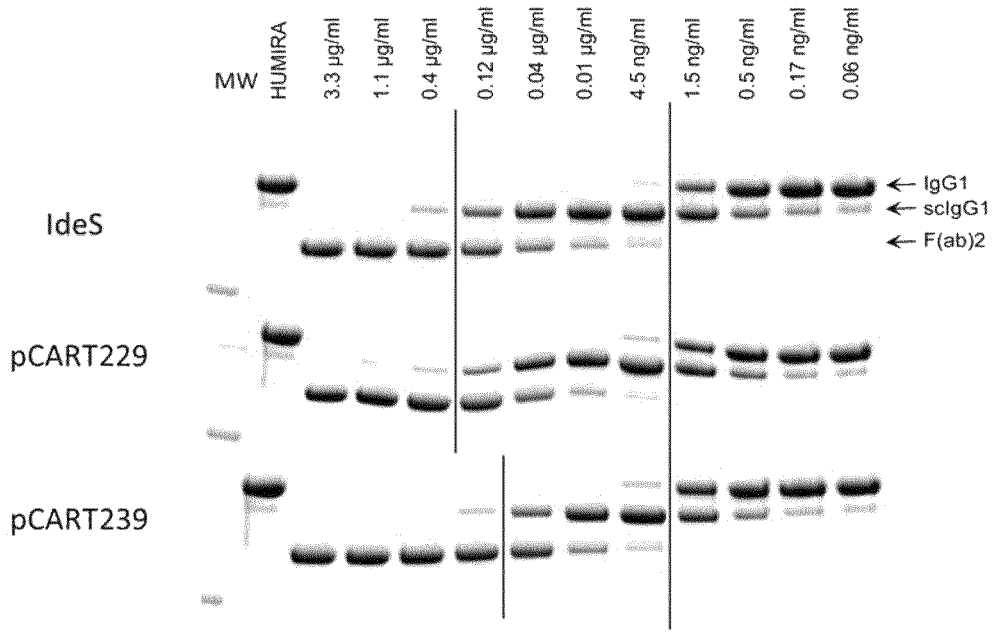
FIG. 2 shows the results of representative SDS-PAGE gels used to visualize the cleavage products produced by incubation of IgG1 (Humira) with IdeS and tested IdeZ variants, as indicated. The concentrations above the lanes indicate the concentration of IdeS/IdeZ variant tested. Panels A and B represent two separate experiments.
Figure 2:
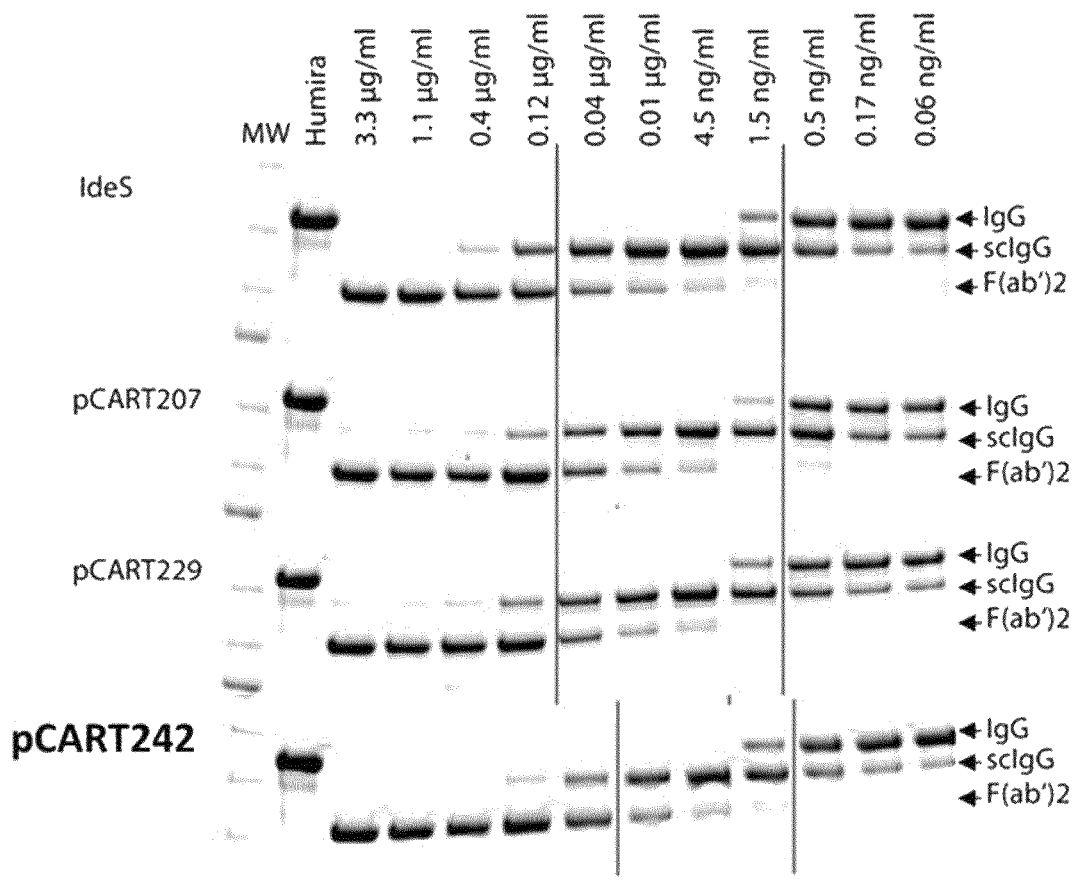
Figure 3:
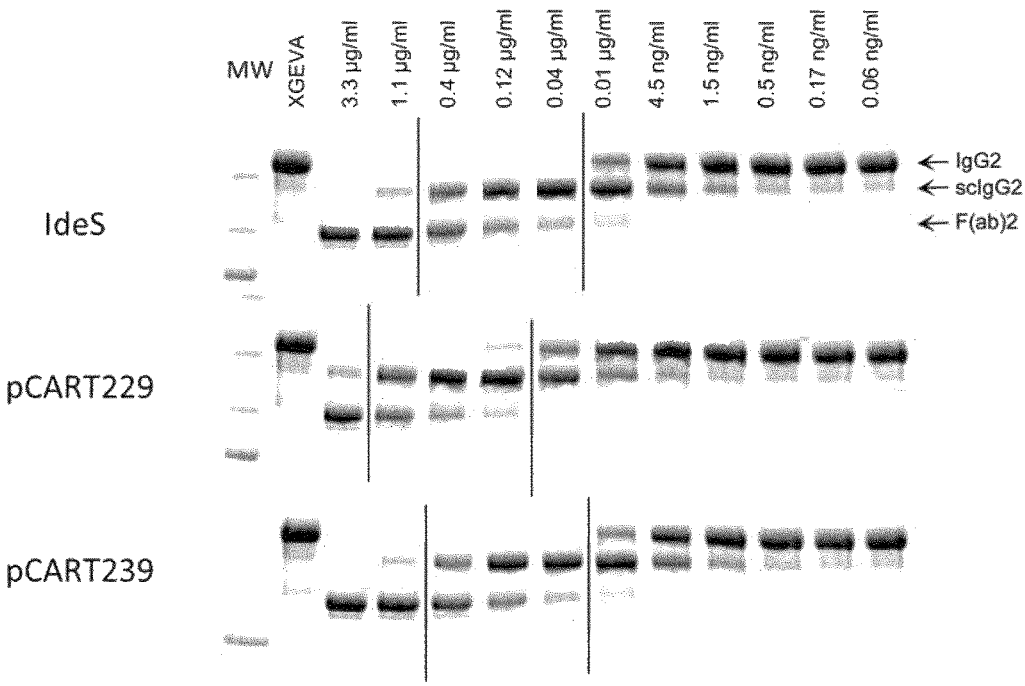
FIG. 3 shows the results of representative SDS-PAGE gels used to visualize the cleavage products produced by incubation of IgG2 (XGEVA) with IdeS and tested IdeZ variants, as indicated. The concentrations above the lanes indicate the concentration of IdeS/IdeZ variant tested. Panels A and B represent two separate experiments.
Figure 3:
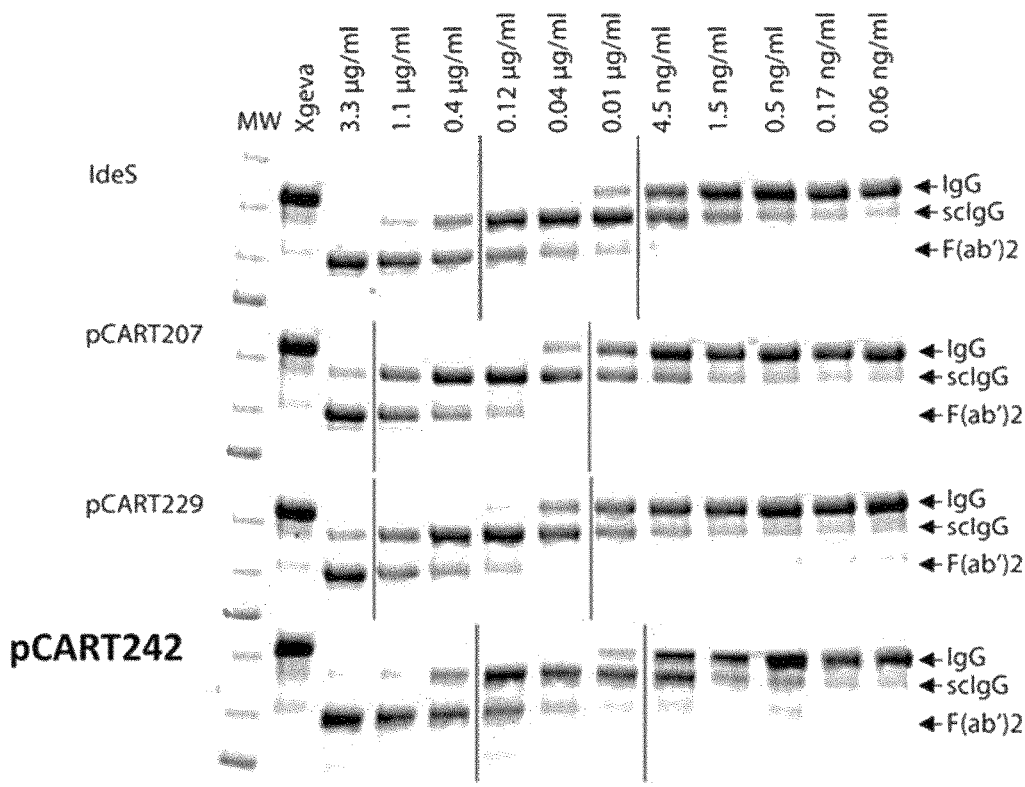

The gels showing digestion of IgG1 (Humira) and IgG2 (XGEVA) by the IdeZ variants are shown in FIGS. 2 and 3 respectively. The different panels represent different sets of experiments (but the protocol was identical in each case).

Approximate concentrations for cleavage of the $1^{st}$ and $2^{nd}$ heavy chains of IgG1/IgG2 were estimated from the cleavage pattern shown in the gels as follows:

TABLE 1A

Approximate concentrations for cleavage of $1^{st}$ and $2^{nd}$ heavy chain of IgG1 (FIG. 2A).

| ID | $1^{st}$ IgG1 heavy chain IgG to scIgG Conc. of enzyme (ng/ml) | $2^{nd}$ IgG1 heavy chain scIgG to F(ab')$_2$ Conc. of enzyme (ng/ml) | Approximate EC50 value, i.e. equal amounts of scIgG and F(ab')$_2$ Conc. of enzyme (ng/ml) |
|---|---|---|---|
| IdeS | 4.5 | 400 | 120 |
| pCART229 | 4.5 | 400 | 40-120 |
| pCART239 | 4.5 | 120 | 10-40 |

TABLE 1B

Approximate concentrations for cleavage of $1^{st}$ and $2^{nd}$ heavy chain of IgG1 (FIG. 2B).

| ID | $1^{st}$ IgG1 heavy chain IgG to scIgG Conc. of enzyme (ng/ml) | $2^{nd}$ IgG1 heavy chain scIgG to F(ab')$_2$ Conc. of enzyme (ng/ml) | Approximate EC50 value, i.e. equal amounts of scIgG and F(ab')$_2$ Conc. of enzyme (ng/ml) |
|---|---|---|---|
| IdeS | 1.5 | 120 | 40-120 |
| pCART207 | 1.5 | 120 | 40 |
| pCART229 | 1.5 | 120 | 40 |
| pCART242 | 1.5 | 40 | 10-40 |

TABLE 2A

Approximate concentrations for cleavage of $1^{st}$ and $2^{nd}$ heavy chain of IgG2 (FIG. 3A).

| ID | $1^{st}$ IgG2 heavy chain IgG to scIgG Conc. of enzyme (ng/ml) | $2^{nd}$ IgG2 heavy chain scIgG to F(ab')$_2$ Conc. of enzyme (ng/ml) | Approximate EC50 value, i.e. equal amounts of scIgG and F(ab')$_2$ Conc. of enzyme (ng/ml) |
|---|---|---|---|
| IdeS | 40 | 1100 | 120-400 |
| pCART229 | 120 | 3300 | 1100-3300 |
| pCART239 | 10 | 1100 | 120-400 |

TABLE 2B

Approximate concentrations for cleavage of $1^{st}$ and $2^{nd}$ heavy chain of IgG2 (FIG. 3B).

| ID | $1^{st}$ IgG2 heavy chain IgG to scIgG Conc. of enzyme (ng/ml) | $2^{nd}$ IgG2 heavy chain scIgG to F(ab')$_2$ Conc. of enzyme (ng/ml) | Approximate EC50 value, i.e. equal amounts of scIgG and F(ab')$_2$ Conc. of enzyme (ng/ml) |
|---|---|---|---|
| IdeS | 10 | 400 | 120-400 |
| pCART207 | 40 | 3300 | 1100 |
| pCART229 | 40 | 3300 | 1100 |
| pCART242 | 10 | 400 | 120-400 |

Summary

The efficacy of IdeS, pCART207, pCART229 are very similar in relation to IgG1 (Humira) cleavage. Higher efficacy is seen for pCART239 and N240 compared to both IdeS and the very similar variant pCART229. N240 and pCART242 appears to be more potent than IdeS in cleaving the second IgG1 heavy chain. N240 and pCART242 have higher potency than pCART229 and pCART207 on primarily the $2^{nd}$ cleavage of IgG2 (Xgeva), but also more potent in cleaving the $1^{st}$ heavy chain of IgG2.

Example 3—Efficacy of N240 Against Human IgG Subclasses

This report describes the characterization of N240 activity in vitro by digestion of various IgG subclasses. For the case of IgG subclasses, two different in-house produced N240 batches are compared, and the reference material used is IdeS.

Methods 1. 25 µl of the N240 or IdeS enzyme and control (buffer) dilutions were transferred to a multititre plate. The enzyme was serial diluted 1:3 in 0.05% BSA in PBS between each successive well.
2. The reaction was started by adding 25 µl of 2 mg/ml solution of human IgG to each well. This resulted in 1 mg/ml of each antibody in the reaction. IgG1 used was Humira (Abbvie), IgG2 used was XGEVA (Amgen), IgG3 used was from Sigma (15654 Lot #SLBW0899), IgG4 used was from Abcam (ab90286 Lot #GR3180469).
3. The plates are incubated at 37° C. on slow rotation for 2 hours.
4. Following incubation, 10 µl of each sample were mixed with 30 µl 2×SDS loading buffer in microtiter plates. Following overnight storage (4-8° C.), this was transferred to 1.5 ml tubes and incubated at 92° C. for 5 min and 10 µl sample was loaded on a 15-well 4-20% Mini-PROTEAN@TGX™ precast gel.

Figure 4:
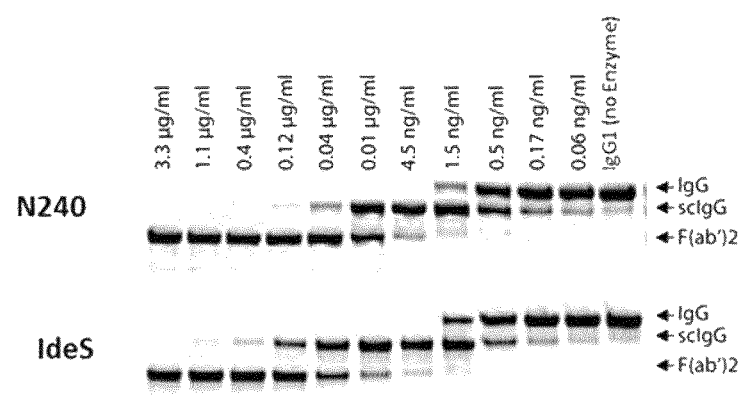
FIG. 4 shows the results of representative SDS-PAGE gels used to visualize the cleavage products produced by incubation of: (A) IgG1 (Humira); (B) IgG2 (XGEVA); (C) IgG3; (D) IgG4, with IdeS and N240, as indicated. The concentrations above the lanes indicate the concentration of IdeS/IdeZ variant tested.
Figure 4:
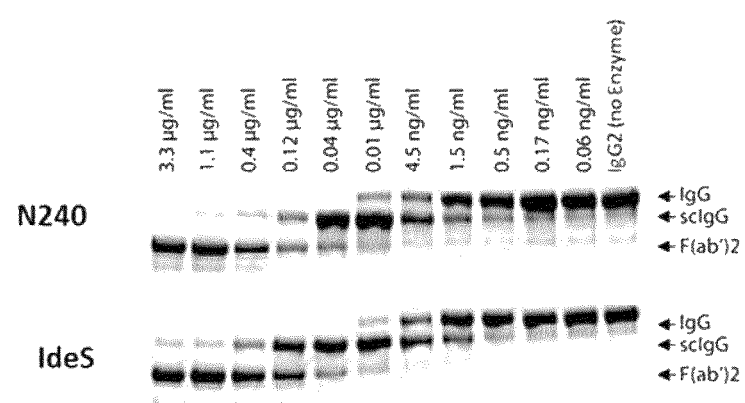
Figure 4:
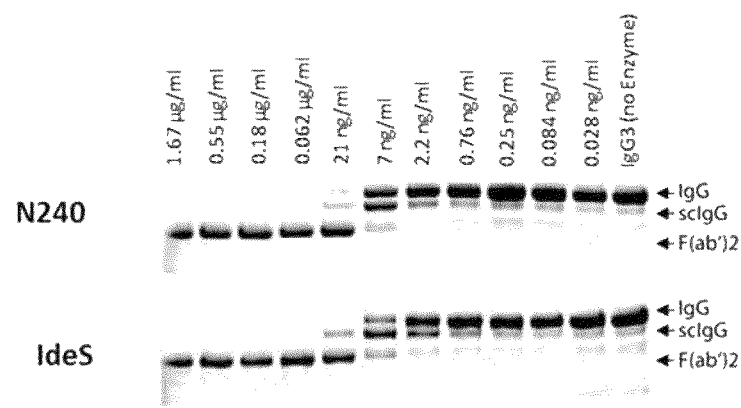
Figure 4:
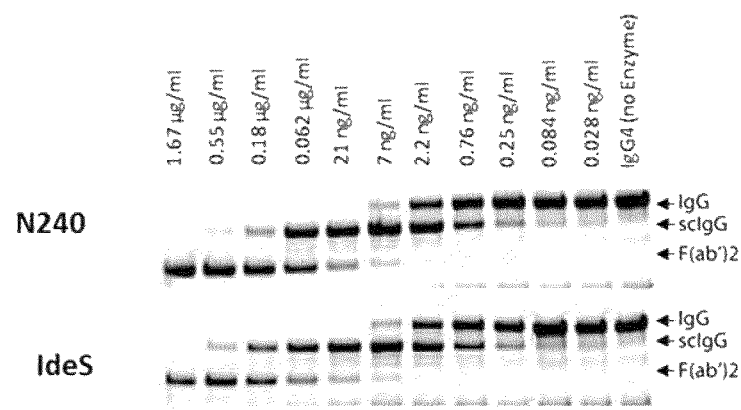

The gels showing digestion of IgG subclasses by N240 and IdeS are shown in FIG. 4.

Estimated $EC_{50}$ values originated from visual findings on gels are listed in Table 3 below.

TABLE 3

| $EC_{50}$ results for IgG1, IgG2, IgG3 and IgG4 digestions | | | |
|---|---|---|---|
| IgG1 $EC_{50}$ scIgG | IgG1 $EC_{50}$ F(ab')$_2$ | IgG2 $EC_{50}$ scIgG | IgG2 $EC_{50}$ F(ab')$_2$ |
| N240  0.5 ng/mL | 14 ng/mL | 4.6 ng/mL | 120 ng/mL |
| IdeS  1 ng/mL | 80 ng/mL | 3 ng/mL | 120 ng/mL |
| IgG3 $EC_{50}$ scIgG | IgG3 $EC_{50}$ F(ab')$_2$ | IgG4 $EC_{50}$ scIgG | IgG4 $EC_{50}$ F(ab')$_2$ |
| N240  7 ng/mL | 15 ng/mL | 2 ng/mL | 62 ng/mL |
| IdeS  2.2 ng/mL | 15 ng/mL | 2 ng/mL | 180 ng/mL |

Summary

1. All the four human subclasses IgG1, IgG2, IgG3 and IgG4, are cleaved by N240.
2. Higher activity (with respect to IdeS) is clearly seen for N240 especially for second chain cleavage. $EC_{50}$ F(ab')$_2$ for IgG1 was approximately 5 times higher for IdeS compared to N240.
3. In the cases of IgG2, IgG3 and IgG4, N240 had similar or slightly lower potency than IdeS.

Example 4—MSD Potency Assay Comparison Between N240 and IdeS

Methods

A more detailed summary of the principles behind the MSD potency assay is discussed below in Example 5.

In brief, a Goat Anti-Human IgG, F(ab')$_2$ Fragment Specific was coated on a 96-well MSD plate. After blocking, the plate was washed, and the N240 reference material and the IdeS test sample, both diluted in a series of concentrations were added to the plate. A fixed concentration of Human IgG was added and the plate was incubated at 3° C. After incubation and washing, a detection mix containing biotinylated mouse anti-human IgG (Fc-specific) and SULFO-TAG labelled streptavidin was added to the plate. After a final incubation and wash, Read Buffer was added. Using the MSD instrument, the intensity of emitted light from the SULFO-TAG was measured to provide a quantitative measure of non-cleaved and single cleaved IgG in the samples. N240 reference material and IdeS test samples were analysed in duplicate wells and in triplicate plates. $EC_{50}$ for each reference and test sample was obtained by fitting the results to a 5-parameter curve. Relative potency (%) for each test sample was determined by dividing $EC_{50}Ref/EC_{50}Test$ and multiplied by 100%. The reported value is a mean from the three different plates.

Figure 5:
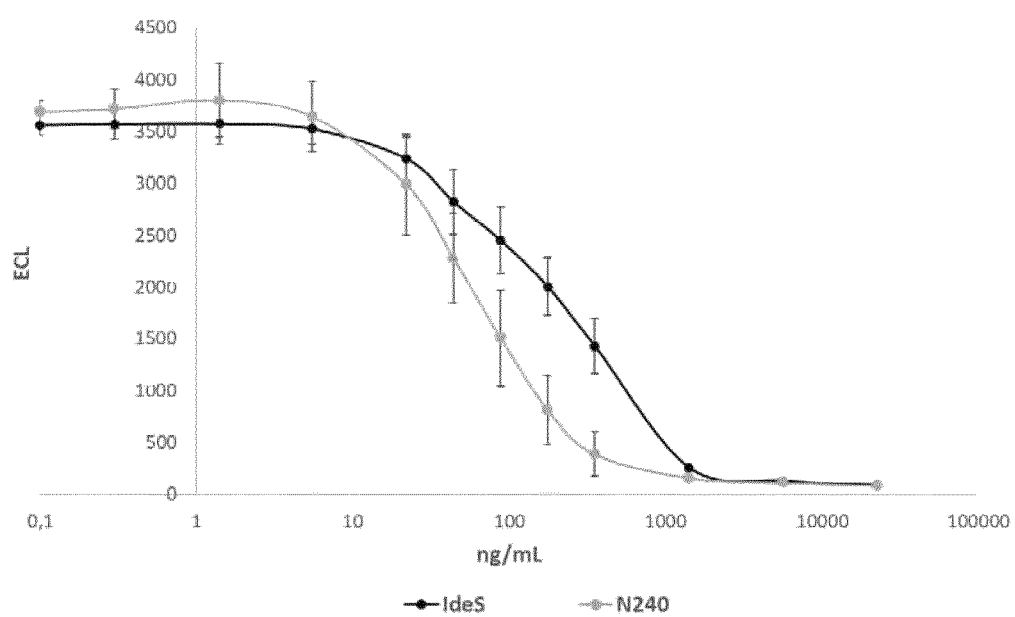
FIG. 5 shows a fitted titration curve of the mean electrochemiluminescence (ECL) values from triplicate samples in an assay to determine the potency (efficacy at cleavage of IgG1) of N240 when compared to IdeS. Error bars represent SD.

The resulting dilution curves representing IgG cleavage for IdeS and N240 are shown in FIG. 5.

The mean relative potency for N240 was calculated to be approximately 300% compared to IdeS.

Example 5—Efficacy of pCART239 Against IgG in Human Serum

The IdeZ variant pCART239 was further characterized by measuring its activity in serum.

Human serum pool from 100 individuals was used as the IgG substrate.

SDS-PAGE

The dilution series used for pCART239 were the following: 30, 15, 7.5, 3.75, 1.9, 0.9, 0.2, 0.2, 0.1, 0.06 and 0.03 µg/mL, and the activity assay and SDS-PAGE analysis protocol as outlined in Examples 2 and 3 were followed.

Figure 6:
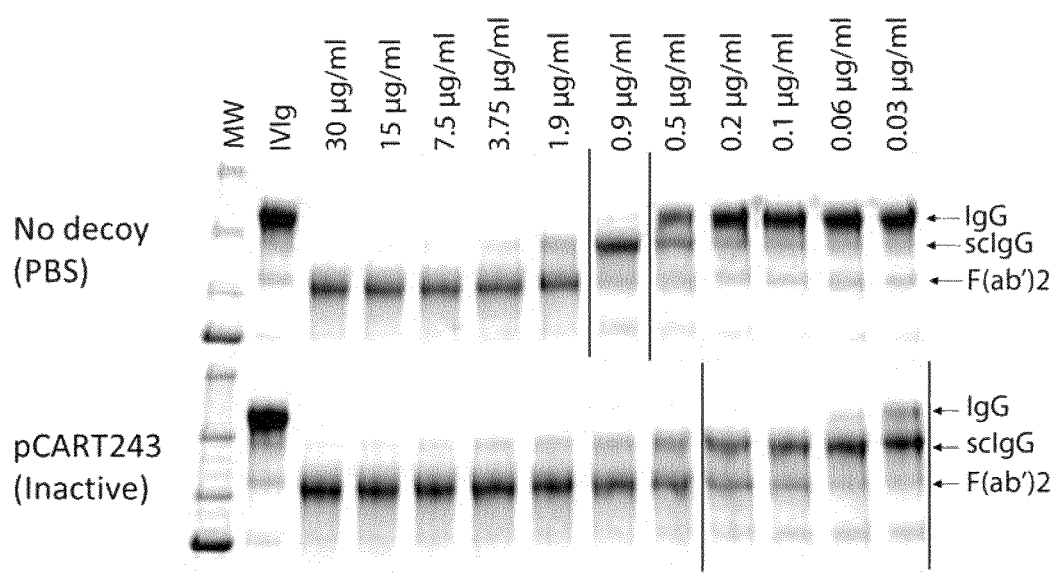
FIG. 6 shows digestion of serum IgG by pCART239 with and without a decoy (an inactive version of pCART239). The use of the decoy can reduce the inhibiting effect of ADA present in serum. The concentrations above the lanes indicate the concentration of IdeZ variant tested.

The gels showing digestion of serum IgG by pCART239 are shown in FIG. 6. The figures show that pCART239 has IgG cleavage activity in the serum pool, and the gels estimate cleavage from IgG to scIgG at approximately 0.9 µg/ml of enzyme (FIG. 6, top panel). The scIgG are further digested into F(ab')$_2$ and Fc fragments at approximately 1.9 µg/ml of enzyme.

The activity values obtained in serum are lower than those obtained in buffer, a known phenomenon from previous studies due to the presence of inhibitory anti-drug-antibodies (ADA) in serum. To verify that there is no other specific inhibitory factor in the serum than inhibitory ADA, an experiment was made with addition of an inactive variant of the pCART239 (pCART243), at 0.1 mg/ml. This addition is in high molar excess and should bind the inactivating ADA to the extent that the activity of pCART239 in serum is restored. This was shown to be the case (FIG. 6, bottom panel), and the presence of pCART243 allowed the cleavage of IgG to occur at much lower pCART239 concentration. Intact IgG started to be digested already at 0.03 μg/ml, and all IgG were converted to scIgG at 0.5 μg/ml.

Electrochemiluminescence Meso Scale Discovery (MSD) Platform

To further investigate N240 activity in serum, an MSD potency assay was made in serum matrix.

The principle of the assays was to coat wells of a multi titre plate with a F(ab)$_2$-fragment directed to human IgG antibodies with specificity to the Fab region. Then titrated concentrations of IgG cysteine protease polypeptide (test or control) were incubated together with human serum in wells. The quantity of intact or single cleaved human IgG bound to the wells was measured using a detector antibody directed to human IgG with specificity against the Fc part of the antibody. The higher the concentration of a given IgG cysteine protease polypeptide in a well, the less intact human IgG antibody will be bound to the well, giving a lower signal. Similarly, a more potent IgG cysteine protease polypeptide will give a lower signal than a less potent IgG cysteine protease polypeptide when present at the same concentration. Titration dose-response curves were prepared for the IdeS control (pCART124) and N240. Potency was estimated by calculating $EC_{50}$ values for the tested cysteine protease. A lower $EC_{50}$ value represents a more potent IgG cysteine protease. The cleavage of the first IgG heavy chain, IgG to scIgG, is not visible in this assay because the Fc-part of the IgG is still present and can be detected by the Fc specific detector antibody.

Brief summary of the laboratory protocol: Wells of multi titre plates were coated overnight (+2-8° C.) with Goat-anti-human Fab-specific F(ab)$_2$-fragment (0.5 μg/ml) (Jackson #109-006-097), then washed with PBS+0.05% Tween 20 (PBS-T) and blocked in 0.45% fish gelatin in PBS-T (block buffer) for 45-120 min at room temperature. Control IdeS (pCART124) and the IgG cysteine protease polypeptides to be tested were prepared as titration series in 1:4 dilution steps in block buffer with a starting concentration of 80 μg/ml. Equal volumes (25 μl) of human serum and the titrated amounts of IgG cysteine protease polypeptides were added to the wells and incubated 2 hours with shaking in a controlled temperature environment at 37° C. and then washed with PBS-T. Biotinylated mouse anti-human IgG Fc-specific (m-a-hIgG Bio II, Lot: C0013-ZC43C, Southern Biotech) (600 ng/ml) antibody was mixed with Strep-sulfo (200 ng/ml) and added to the multi titre plates. The plates were sealed with aluminum tape and incubated at +25° C. for 1 hour with shaking. The plates were then washed in PBS-T and 150 μl of 2× diluted Read buffer T (MSD read buffer T, Cat. no. R92TC-2) were added to each well. The plates were immediately read on a Plate reader, MSD (Meso Scale Discovery) QuickPlex SQ 120 Model 1300.

Figure 7:
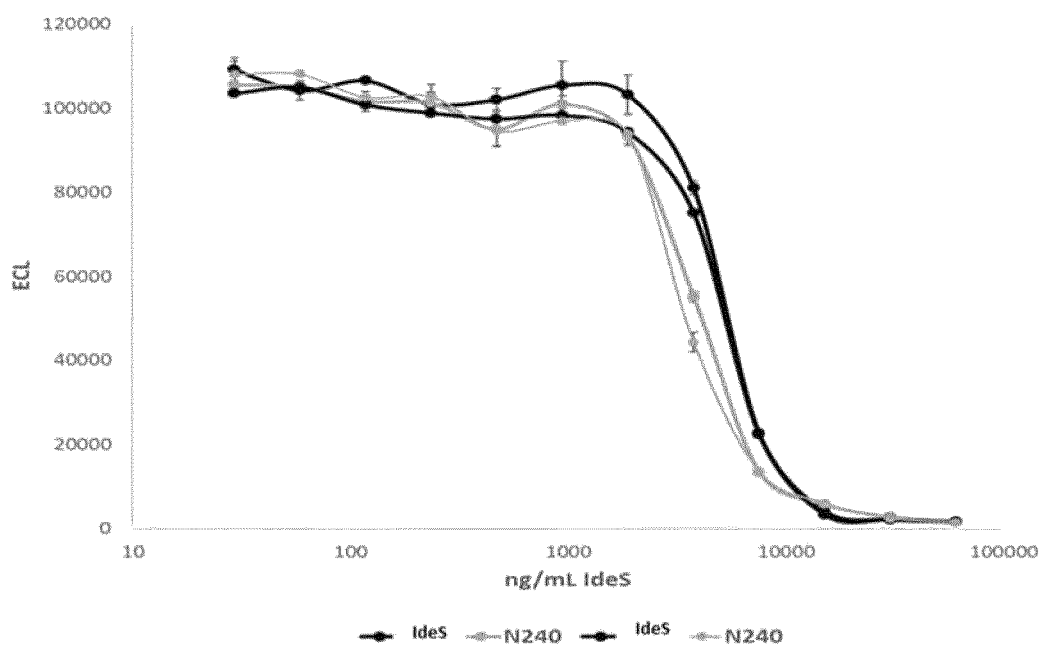
FIG. 7 shows a fitted titration curve of the mean electrochemiluminescence (ECL) values from triplicate samples and two separate dilution series in an assay to determine the potency of N240 and IdeS in serum (efficacy at cleavage of IgG). Error bars represent SD.

The resulting standard curves representing IgG cleavage for IdeS and N240 are shown in FIG. 7. The table below shows estimates of relative potencies based on $EC_{50}$ values determined from the dose response curves.

TABLE 4

Relative potency for IgG cleavage in serum estimated from $EC_{50}$ values

| Sample no | Sample ID | Relative Potency (%) In Serum Plate 1 | Relative Potency (%) In Serum Plate 2 | Relative Potency (%) In serum Mean value |
|---|---|---|---|---|
| Ref | IdeS | 100 | 100 | 100 |
| 1 | N240 | 151 | 132 | 142 |
| 2 | N240 (separate dilutions) | 137 | 146 | 142 |

Summary

N240 is active in serum. The potency of N240 in buffered solution was shown in previous Examples to be approximately four-fold higher than potency of imlifidase, but this difference is smaller when the two enzymes are compared in serum. In MSD potency analysis, N240 still showed a substantial increase in activity towards human IgG in serum when compared to IdeS (~142%).

Example 6—N240 and IdeS ADA Levels in Healthy Individuals

The general MSD protocol as described in Example 5 was followed apart from the following.

Multi array MSD plates were coated with 20 μg/ml N240 or IdeS. Plates were blocked with fish gelatine before incubation with serum (1:100 dilution) from healthy individuals (n=40) and one human serum pool (n=100). The detection reagent was an anti-human F(ab')$_2$-specific F(ab')$_2$-bio antibody (JAX, 109-066-097) together with Streptavidin-Sulfo (MSD #R32AD-1). After adding the Read Buffer (MSD #R92TC-2) the plates were read using the MSD QuickPlex SQ 120.

Figure 8:
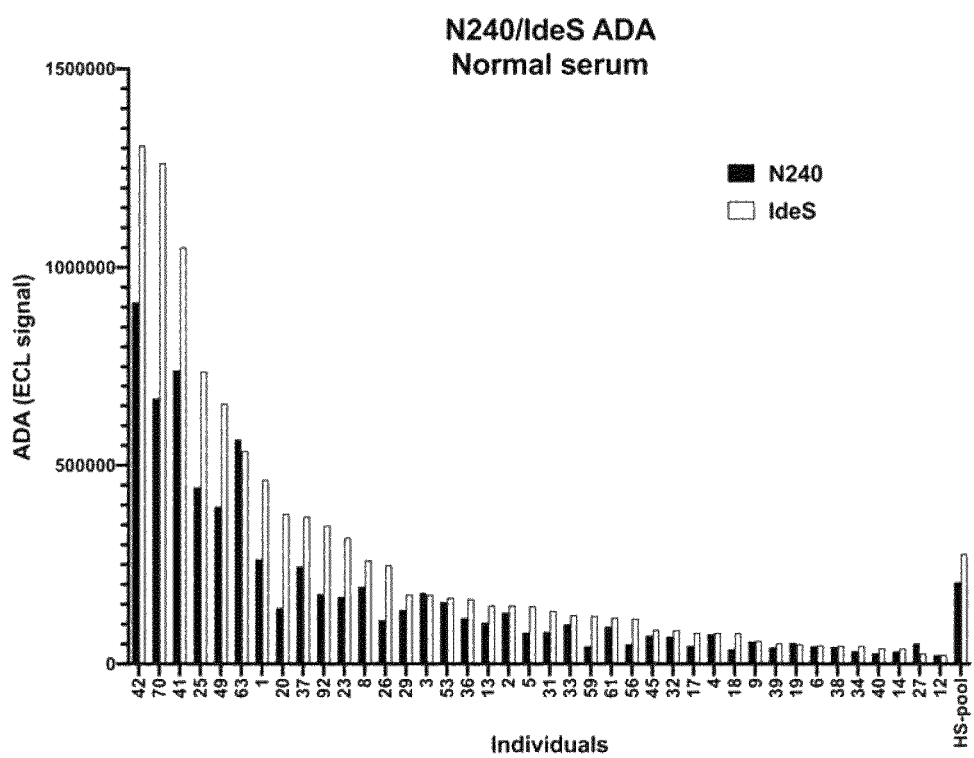
FIG. 8 shows mean ECL values corresponding to levels of pre-existing N240 and IdeS ADA in serum from 40 healthy individuals and in one normal serum pool (n=100).

The results are presented in FIG. 8. This result shows that levels of ADA against N240 are lower than ADA against IdeS.

The invention claimed is:

1. A polypeptide having IgG cysteine protease activity and comprising or consisting of an amino acid sequence which is:
   (i) SEQ ID NO: 1; or
   (ii) SEQ ID NO: 2; or
   (iii) a variant of SEQ ID NO: 1 or SEQ ID NO: 2, which has 1, 2, 3, 4, 5, 6, 7, 8, 9 or 10 amino acid modification(s) relative to SEQ ID NO: 1 or SEQ ID NO: 2 respectively, provided that the sequence retains: (a) an asparagine (N) at the position which corresponds to position 95 of SEQ ID NO: 5, (b) an aspartic acid (D) at the position which corresponds to position 99 of SEQ ID NO: 5 and (c) an asparagine (N) at the position which corresponds to position 226 of SEQ ID NO: 5, and provided that the polypeptide is at least as effective at cleaving human IgG as the polypeptide consisting of the amino acid sequence of SEQ ID NOs: 1 or 2 respectively, when measured in the same assay.

2. The polypeptide according to claim 1, wherein at least one of the modifications in (iii) does not result in the same amino acid as is present in the corresponding position in the polypeptide sequence of SEQ ID NO: 3.

3. A polypeptide according to claim 1, wherein the polypeptide further comprises an additional methionine at the N terminus and/or an additional histidine tag at the C terminus.

4. A polypeptide according to claim 1, wherein the polypeptide is more effective at cleaving human IgG than an IdeZ polypeptide and/or is at least as effective at cleaving human IgG as an IdeS polypeptide, when measured in the same assay.

5. A polypeptide according to claim 1, wherein the polypeptide is more effective at cleaving human IgG than an IdeS polypeptide when measured in the same assay.

6. A polypeptide according to claim 5, wherein the polypeptide is at least 1.2 fold, preferably 1.3 fold, most preferably 1.4 fold more effective at cleaving human IgG than an IdeS polypeptide when measured in the same assay.

7. A composition comprising a polypeptide according to claim 1 and at least one pharmaceutically acceptable carrier or diluent.

* * * * *